US010885931B2

(12) United States Patent
Togawa et al.

(10) Patent No.: US 10,885,931 B2
(45) Date of Patent: Jan. 5, 2021

(54) VOICE PROCESSING METHOD, VOICE PROCESSING APPARATUS, AND NON-TRANSITORY COMPUTER-READABLE STORAGE MEDIUM FOR STORING VOICE PROCESSING COMPUTER PROGRAM

(71) Applicant: FUJITSU LIMITED, Kawasaki (JP)

(72) Inventors: Taro Togawa, Kawasaki (JP); Sayuri Nakayama, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 16/139,291

(22) Filed: Sep. 24, 2018

(65) Prior Publication Data

US 2019/0096433 A1 Mar. 28, 2019

(30) Foreign Application Priority Data

Sep. 27, 2017 (JP) .................. 2017-186584

(51) Int. Cl.
*G10L 25/00* (2013.01)
*G10L 25/90* (2013.01)
(Continued)

(52) U.S. Cl.
CPC .............. *G10L 25/90* (2013.01); *G10L 15/02* (2013.01); *G10L 15/063* (2013.01); *G10L 25/03* (2013.01);
(Continued)

(58) Field of Classification Search
CPC ......... G10L 25/00; G10L 25/03; G10L 25/06; G10L 25/09; G10L 25/15; G10L 25/18;
(Continued)

(56) References Cited

U.S. PATENT DOCUMENTS

| 4,852,172 A | 7/1989 | Taguchi |
| 5,913,188 A * | 6/1999 | Tzirkel-Hancock .... G10L 15/02 704/221 |
| 2012/0197634 A1* | 8/2012 | Ishikawa ............... G10L 21/057 704/201 |

FOREIGN PATENT DOCUMENTS

| JP | 62-054297 | 3/1987 |
| JP | 2006-227564 | 8/2006 |
| JP | 2006-267465 | 10/2006 |

OTHER PUBLICATIONS

Talkin David, "A Robust Algorithm for Pitch Tracking (RAPT)", Speech Coding and Synthesis, Chapter 14, 1995 (23 pages).

* cited by examiner

*Primary Examiner* — Qi Han
(74) *Attorney, Agent, or Firm* — Fujitsu Patent Center

(57) ABSTRACT

A voice processing method for estimating an impression of speech includes: executing an acquisition process that includes acquiring voice signals; executing a feature acquisition process that includes acquiring acoustic features regarding the voice signals from the voice signals; executing a voice-parameter acquisition process that includes acquiring a voice parameter regarding a frame of the voice signals; executing a relative-value determination process that includes determining a relative value between the determined voice parameter and a statistical value of the voice parameter; executing a weight assignment process that includes assigning a weight to the frame of the voice signals in accordance with the relative value; and executing a distribution determination process that includes determining a distribution of the acoustic features, based on the weight assigned to the frame of the voice signals.

18 Claims, 17 Drawing Sheets

(51) Int. Cl.
*G10L 15/02* (2006.01)
*G10L 15/06* (2013.01)
*G10L 25/18* (2013.01)
*G10L 25/03* (2013.01)
*G10L 25/51* (2013.01)
*G10L 25/63* (2013.01)
*G10L 25/15* (2013.01)

(52) U.S. Cl.
CPC ............... *G10L 25/18* (2013.01); *G10L 25/51* (2013.01); *G10L 25/15* (2013.01); *G10L 25/63* (2013.01); *G10L 2015/0635* (2013.01)

(58) Field of Classification Search
CPC ......... G10L 25/21; G10L 25/24; G10L 25/63; G10L 25/75; G10L 25/78; G10L 25/84; G10L 25/90
USPC ....... 704/207, 203, 206, 209, 213, 215, 216, 704/226, 224, 233, 234, 255
See application file for complete search history.

VOICE PROCESSING METHOD, VOICE PROCESSING APPARATUS, AND NON-TRANSITORY COMPUTER-READABLE STORAGE MEDIUM FOR STORING VOICE PROCESSING COMPUTER PROGRAM

CROSS-REFERENCE TO RELATED APPLICATION

This application is based upon and claims the benefit of priority of the prior Japanese Patent Application No. 2017-186584, filed on Sep. 27, 2017, the entire contents of which are incorporated herein by reference.

FIELD

The embodiments discussed herein are related to a voice processing method, a voice processing apparatus, and a non-transitory computer-readable storage medium for storing a voice processing computer program.

BACKGROUND

In recent years, many companies have been tending to emphasize customer satisfaction levels, and demands for wanting to recognize impressions of responders and emotions of customers in conversation between the responders and the customers have been increasing. Impressions of responders and emotions of customers often appear in their voice.

For example, in related art, there is a technology for detecting a pitch frequency of voice during a call and determining an impression of the voice.

Examples of the related art include Japanese Laid-open Patent Publication No. 2006-267465 and Japanese Laid-open Patent Publication No. 2006-227564.

SUMMARY

According to an aspect of the invention, a voice processing method for estimating an impression of speech includes: executing an acquisition process that includes acquiring voice signals; executing a feature acquisition process that includes acquiring acoustic features regarding the voice signals from the voice signals; executing a voice-parameter acquisition process that includes acquiring a voice parameter regarding a frame of the voice signals; executing a relative-value determination process that includes determining a relative value between the determined voice parameter and a statistical value of the voice parameter; executing a weight assignment process that includes assigning a weight to the frame of the voice signals in accordance with the relative value; and executing a distribution determination process that includes determining a distribution of the acoustic features, based on the weight assigned to the frame of the voice signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art described above, there are cases in which it is difficult to accurately estimate an impression of speech.

One aspect of the present disclosure provides a technology for accurately estimating an impression of speech in voice processing.

A voice processing program, a voice processing method, and a voice processing apparatus herein will be described below with reference to the accompanying drawings. Embodiments herein are not intended to limit the technology according to the present disclosure. The embodiments may appropriately be combined, as long as such a combination does not cause contradiction.

First Embodiment

A reference technology will be described first before a first embodiment is described. This reference technology is not related art. In the reference technology, pitch frequencies are detected from voice signals at predetermined intervals and a histogram based on the pitch frequencies is generated. In the reference technology, brightness of voice is evaluated based on the spread of the generated histogram. The pitch frequencies correspond to fundamental frequencies.

Figure 1:
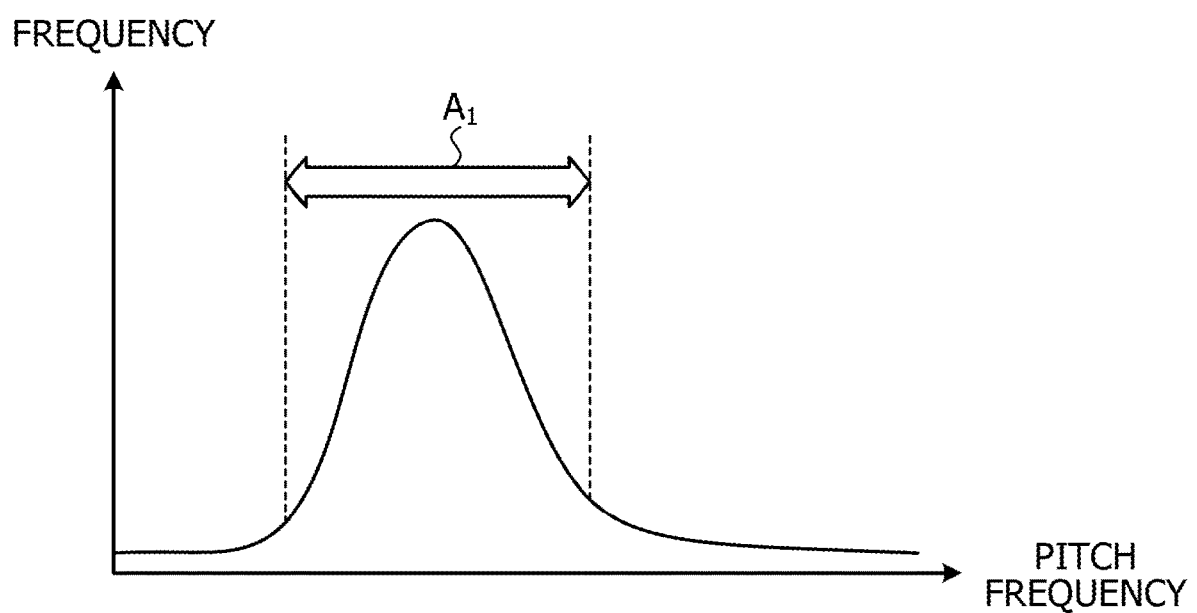
FIG. 1 illustrates an example of a histogram of pitch frequencies in a reference technology.

FIG. 1 illustrates an example of a histogram of pitch frequencies in the reference technology. In the histogram illustrated in FIG. 1, the horizontal axis represents a pitch frequency, and the vertical axis represents a frequency. In the reference technology, a range in which the frequency is larger than a predetermined frequency (which may be referred to as a "first threshold") is detected as the spread of a distribution, and brightness of voice is evaluated based on whether the spread of the distribution is large or small.

In the example illustrated in FIG. 1, in the reference technology, a range $A_1$ is detected as the spread of the distribution. For example, in the reference technology, when the range $A_1$ is larger than a predetermined range (which may also be referred to as a "second threshold"), the voice is evaluated to be bright. On the other hand, in the reference technology, when the range $A_1$ is smaller than the predetermined range, the voice is evaluated to be dark.

Next, a description will be given of a problem in the reference technology. In the reference technology, there are cases in which voice signals include noise generated from the surroundings of a talker, for example, voice of speech of a person other than a talker, and this may make it difficult to appropriately identify the range of the spread of the distribution and may make it difficult to accurately estimate an impression of the talker's speech.

Figure 2:
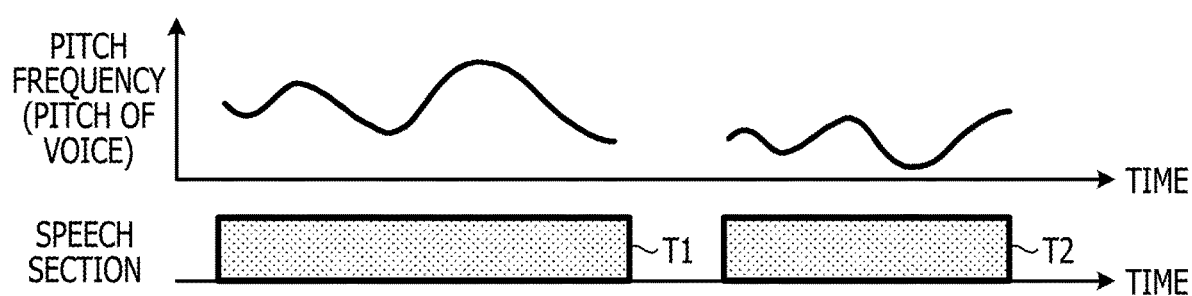
FIG. 2 illustrates a problem in the reference technology.
Figure 3:
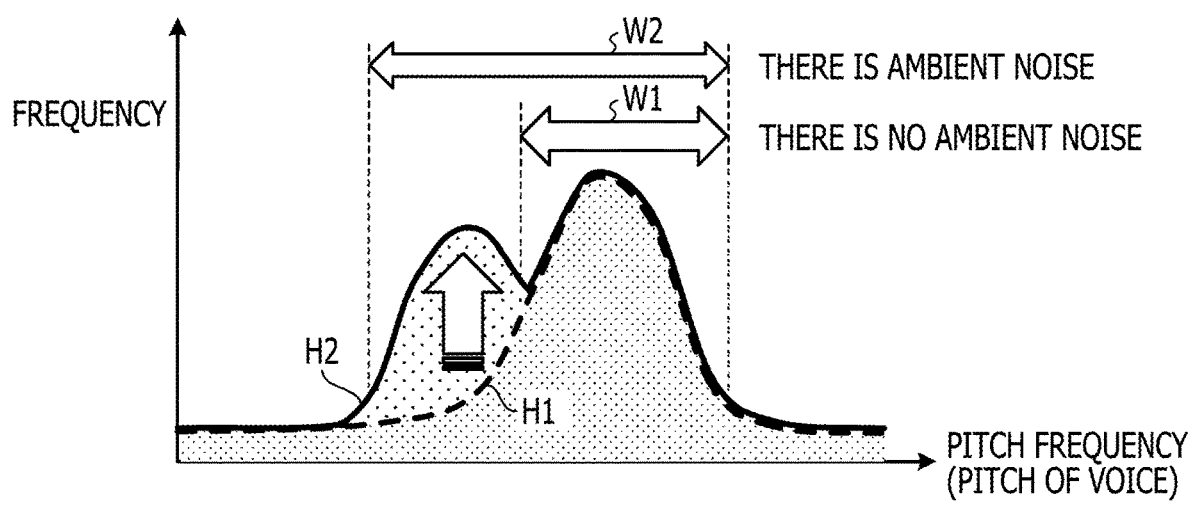
FIG. 3 illustrates a problem in the reference technology.

FIGS. 2 and 3 are graphs for describing problems in the reference technology. FIGS. 2 and 3 illustrate a case in which signals include, in addition to voice spoken by a female talker, voice of a male who speaks in the surroundings of the female talker.

FIG. 2 is a graph illustrating changes in a pitch frequency with time. The vertical axis in the graph represents a pitch frequency, and the horizontal axis represents time. At a lower portion of the graph, speech sections T1 and T2 detected from voice signals are also illustrated.

As illustrated in FIG. 2, changes in the pitch frequency of the talker are observed in the speech section T1, whereas pitch noise in ambient noise is observed in the speech section T2. When a histogram is generated from not only voice of a talker but also a pitch frequency including ambient noise, as described above, the shape of the histogram is also affected by the ambient noise, as illustrated in FIG. 3.

FIG. 3 illustrates an example of a histogram of pitch frequencies. The vertical axis in the graph illustrated in FIG. 3 represents a frequency, and the horizontal axis represents a pitch frequency. As illustrated in FIG. 3, when a histogram is generated using only a pitch frequency determined from the speech section T1, a distribution H1 is formed. In this case, the spread of the distribution H1 is a range W1. When a histogram is generated using pitch frequencies determined from the speech sections T1 and T2, a distribution H2 is formed as a result of influence of the pitch frequency in the speech section T2. In general, since the pitch frequency in the speech section T2 corresponding to the voice of speech of the male who speaks with lower voice than the female talker is counted as a frequency in the histogram, the band in which pitch frequencies are observed becomes larger than that in a case in which only the female talker speaks. As a result, the spread of the distribution H2 becomes a range W2.

When the ranges W1 and W2 are compared with each other, the range W2 is larger, and thus even when a talker speaks at the same pitch, voice in the range W2 is more likely to be evaluated to be bright when ambient noise is included. Thus, in the reference technology, there are cases in which dark voice is erroneously determined to be bright voice.

Accordingly, a voice processing apparatus according to the present embodiment implements voice processing functions for determining, as a talker's voice likelihood, a relative value between a voice parameter determined from a frame of voice signals and a statistical value of the voice parameter and for generating a pitch frequency distribution by changing a frequency weight assigned to the frame in accordance with the voice likelihood.

The "voice parameter" as used herein refers to various types of parameter regarding voice signals. Examples of the voice parameter include a signal-to-noise ratio (SNR), spectral power, and autocorrelation, in addition to the strength of voice signals.

For example, when frame power is used as an example of the voice parameter, a relative value relative to a maximum value of frame powers observed after input of voice signals is started is determined to thereby determine a talker's voice likelihood. The reason why the relative value of the frame power relative to the maximum value is that comparison between the strength of a talker's components included in voice signals and the strength of ambient noise components therein makes it possible to evaluate that the strength of the talker's components is sufficiently larger than the other. That is, it is possible to evaluate that, as the frame power gets closer to the maximum value, the possibility that a frame from which the frame power is determined includes a talker's speech increases, and as the frame power gets farther from the maximum value, the possibility that a frame from which the frame power is determined includes ambient noise increases.

When a histogram is generated according to such a talker's voice likelihood, a value added to a frequency corresponding to a bin to which a pitch frequency belongs may be varied between frames used for generating the histogram. That is, a higher weight is assigned to a frame in which the possibility that a talker spoke is higher, whereas a lower weight is assigned to a frame in which the possibility that the frame includes ambient noise is higher. For example, based on the correspondence illustrated in FIG. 4, a weighting factor is assigned to a frame for which a pitch frequency is determined.

Figure 4:
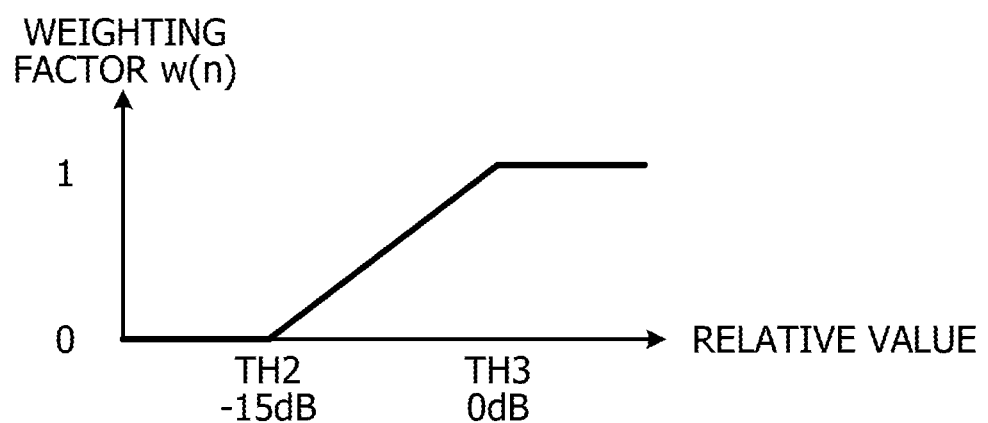
FIG. 4 illustrates an example of a graph of a correspondence between voice likelihood and a weighting factor.

FIG. 4 illustrates an example of a graph of a correspondence between voice likelihood and the weighting factor. The vertical axis in the graph illustrated in FIG. 4 represents a weighting factor, and for example, a value normalized to a range of 0 to 1 is used therefor. The horizontal axis in the graph illustrated in FIG. 4 represents a relative value relative to the maximum value of frame powers, and for example, the relative value may be determined by subtracting a frame power from the maximum value.

As illustrated in FIG. 4, when a relative value that is larger than or equal to a threshold TH3, for example, 0 dB, is determined, it is identified that frame power having a value that is the same as the largest-ever frame power is determined or the corresponding frame is a frame for which the record of largest-ever frame power is updated. In this case, since the corresponding frame can be said to be a frame in which the possibility that a talker spoke is high, a weighting factor "1" is assigned to the frame. When a relative value that is smaller than a threshold TH2, for example, −15 dB, is determined, the corresponding frame is identified as a frame in which a frame power that is sufficiently smaller than a frame power estimated to be the frame power of past speech of a talker is measured. In this case, since the corresponding frame is said to be a frame including ambient noise, a weighting factor "0" is assigned to the frame. Also, when a relative value that is larger than or equal to the threshold TH2 and is smaller than the threshold TH3 is determined, a weighting factor that is closer to the maximum value "1" of the weighting factor as the relative value gets closer to the threshold TH3 and that is closer to the minimum value "0" of the weighting factor as the relative value gets closer to the threshold TH2 is assigned to the corresponding frame.

A pitch frequency histogram is generated by changing the magnitude of a value added to a frequency corresponding to the bin of a pitch frequency determined from a frame, in accordance with the weighting factor assigned to the frame, as described above. This makes it possible to generate a pitch frequency histogram, with a large weight being assigned to a frame in which a pitch frequency is determined in the speech section T1 and a small weight being assigned to a frame in which a pitch frequency is determined in the speech section T2. As a result, since it is possible to reduce the amount of influence that the pitch frequency in the speech section T2 illustrated in FIG. 2 has on the histogram illustrated in FIG. 3, it is possible to correct the shape of the histogram from the distribution H2 to the distribution H1. Evaluation of the brightness of voice based on the spread of a histogram as described above makes it possible to accurately estimate an impression of speech.

Figure 5:
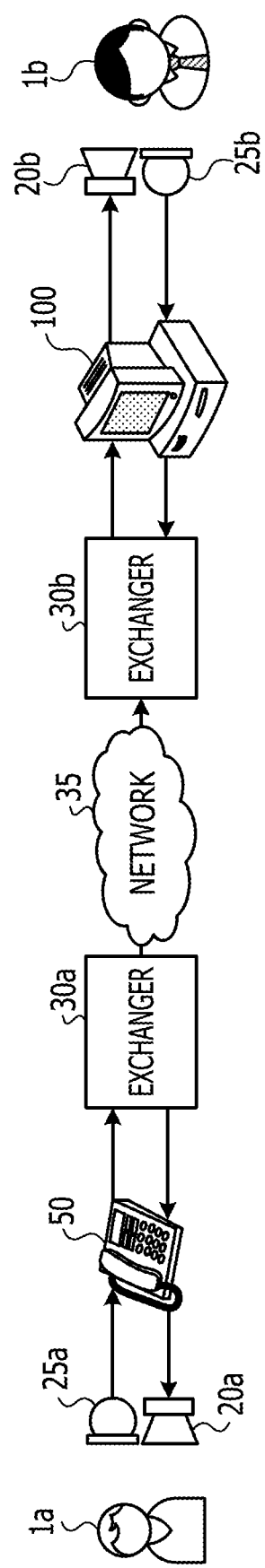
FIG. 5 illustrates the configuration of a system according to a first embodiment.

Next, a description will be given of an example of the configuration of a system including the voice processing apparatus according to the first embodiment. FIG. 5 illustrates the configuration of a system according to the first embodiment. FIG. 5 illustrates, merely as an example of a use case in which the functions of the voice processing apparatus according to the first embodiment is implemented in a computer system, an example of case in which the functions of a voice processing apparatus is implemented in a system that is operated at a customer-facing site, such as a call center or a bank counter.

The system illustrated in FIG. 5 has, as one aspect, a function for evaluating, during a call between a talker 1a corresponding to a customer or the like and a talker 1b corresponding to a responder, such as an operator, an impression the talker 1a has of the talker 1b, for example, a customer satisfaction level, based on the brightness of voice of the talker 1a.

As illustrated in FIG. 5, the system includes a phone 50, exchanges 30a and 30b, and a voice processing apparatus 100. The phone 50 is connected to a speaker 20a and a microphone 25a. The voice processing apparatus 100 is connected to a speaker 20b and a microphone 25b. The speaker 20a and the microphone 25a or the speaker 20b and the microphone 25b may be integrated together and implemented as a headset.

The exchanges 30a and 30b are connected to each other through a network 35. The exchanges 30a and 30b are apparatuses that relay voice signals transmitted from the phone 50 or the voice processing apparatus 100.

The phone 50 acquires voice signals of the talker 1a via the microphone 25a. The phone 50 transmits the acquired voice signals of the talker 1a to the voice processing apparatus 100. The voice signals transmitted from the voice processing apparatus 100 are output from the speaker 20b.

The voice processing apparatus 100 has a phone-call function in addition to the above-described function for evaluating an impression of speech. The voice processing apparatus 100 acquires voice signals of a talker 1b via the microphone 25b. The voice processing apparatus 100 transmits the acquired voice signals of the talker 1b to the phone 50. The voice signals transmitted to the phone 50 are output from the speaker 20a.

Figure 6:
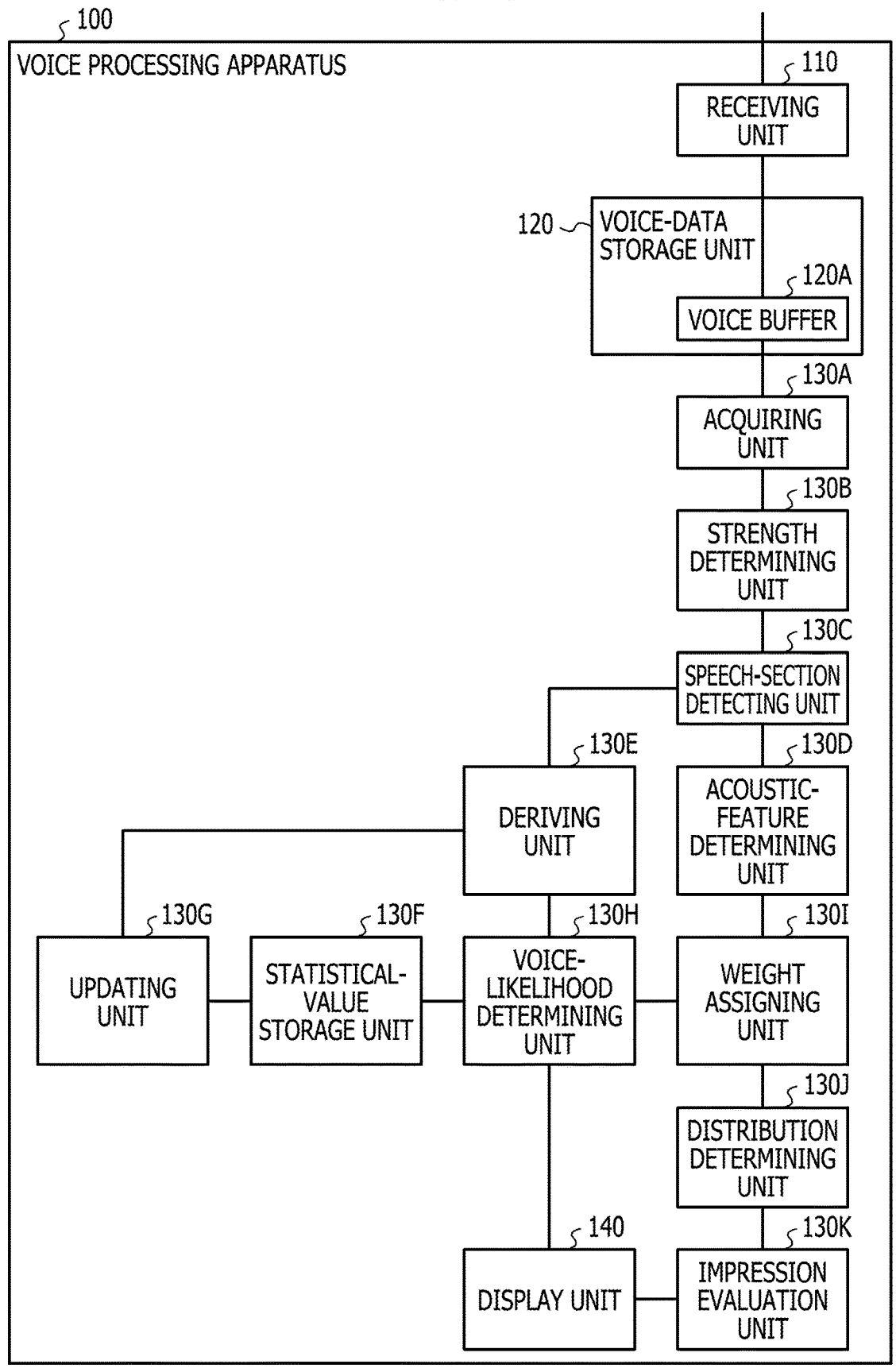
FIG. 6 is a block diagram illustrating an example of the functional configuration of a voice processing apparatus according to the first embodiment.

Next, a description will be given of an example of the functional configuration of the voice processing apparatus 100 according to the first embodiment. FIG. 6 is a block diagram illustrating an example of the functional configuration of the voice processing apparatus according to the first embodiment. As illustrated in FIG. 6, the voice processing apparatus 100 includes a receiving unit 110, a voice-data storage unit 120, an acquiring unit 130A, a strength determining unit 130B, a speech-section detecting unit 130C, an acoustic-feature determining unit 130D, a deriving unit 130E, a statistical-value storage unit 130F, an updating unit 130G, a voice-likelihood determining unit 130H, a weight assigning unit 130I, a distribution determining unit 130J, an impression evaluation unit 130K, and a display unit 140. The voice processing apparatus 100 has a phone-call function that is same as or similar to that described above with reference to FIG. 5, and since this phone-call function is analogous to a known phone-call function, a description thereof is not given hereinafter.

The processing units, such as the receiving unit 110, the acquiring unit 130A, the strength determining unit 130B, the speech-section detecting unit 130C, the acoustic-feature determining unit 130D, the deriving unit 130E, the updating unit 130G, the voice-likelihood determining unit 130H, the weight assigning unit 130I, the distribution determining unit 130J, and the impression evaluation unit 130K, illustrated in FIG. 6 are virtually realized by a hardware processor, such as a central processing unit (CPU) or a micro processing unit (MPU).

That is, the processor reads a program, such as a voice processing program for realizing the above-described voice processing functions, in addition to an operating system (OS), from a storage device (not illustrated), for example, an auxiliary storage device, such as a hard disk drive (HDD) or a solid-state drive (SSD). Although an example in which the program is read from an auxiliary storage device has been described above, the program may be read from an internal storage, such as a flash memory typified by an electrically erasable programmable read-only memory (EEPROM). In addition, the processor executes the above-described voice processing program to thereby load processes corresponding to the functions of the voice processing program into a memory, such as a random-access memory (RAM). As a result, the above-described voice processing functions are virtually realized as processes. Although a CPU and an MPU have been described above as examples of the processor, the above-described functional units may also be realized by any processor, regardless of whether it is a processor for general or specific purposes. Additionally, the above-described functional units may be realized by a hard-wired logic, such as an application-specific integrated circuit (ASIC) or a field programmable gate array (FPGA).

Storage units, such as the voice-data storage unit 120 and the statistical-value storage unit 130F, are implemented as primary storage devices that are accessible by the above-described processing units. For example, the storage units may be implemented by primary storage devices, including semiconductor memory elements, such as RAMs and flash memories. The voice-data storage unit 120 may be implemented as, in addition to such a primary storage device, an auxiliary storage device, such as an SSD or an HDD.

The receiving unit 110 is a processing unit that receives voice signals of the talker 1a from the phone 50. The receiving unit 110 records the received voice signals to a voice buffer 120A in the voice-data storage unit 120.

The voice buffer 120A in the voice-data storage unit 120 holds the voice signals of the talker 1a.

In one illustrative example, a voice file obtained by converting the voice signals, received from the phone 50, in accordance with a predetermined format is saved to the voice buffer 120A. The "voice signals" as used herein refers to digital data in which voice amplitudes are arranged in time series. Also, the "frame" as used hereinbelow may be each of sections obtained by dividing voice signals by a predetermined time period, such as 20 ms, or may be each of sections delimited in a state in which voice signals overlap partly, by sliding a window with a predetermined time period in increments of a shift width that is smaller than the time period.

The acquiring unit 130A is a processing unit that acquires voice signals.

In one illustrative example, the acquiring unit 130A acquires voice signals from the voice buffer 120A for each frame, for example, in a unit of 20 ms or the like. In this case, each time a voice signal frame is stored in the voice buffer 120A, the acquiring unit 130A may acquire the voice signal frame in real time, or after a call between the talker 1a and the talker 1b is finished, the acquiring unit 130A may acquire, by batch processing, voice signal frames from the voice buffer 120A in order starting with the frame at the front end. Each voice signal frame acquired by the acquiring unit 130A in the manner described above is output to the strength determining unit 130B.

The strength determining unit 130B is a processing unit that determines a strength in a voice signal frame.

In one illustrative example, each time the acquiring unit 130A acquires a voice signal frame, the strength determining unit 130B determines a power S(n) in the frame in accordance with equation (1) noted below. In equation (1), "C(t)" represents an amplitude of a voice signal C at time t. Also, "n" represents a frame number. "M" represents the duration of one frame and may be, for example, 20 ms.

$$S(n) = 10\log_{10}\left(\sum_{t=n*M}^{(n+1)*M-1} C(t)^2\right) \quad (1)$$

The speech-section detecting unit 130C is a processing unit that detects a speech section from voice signals.

In one illustrative example, the speech-section detecting unit 130C determines whether or not the frame power determined by the strength determining unit 130B is larger than or equal to a predetermined threshold TH1. When the frame power is larger than or equal to the threshold TH1, the speech-section detecting unit 130C determines whether or not a frame power that is larger than or equal to the threshold TH1 was observed in a frame immediately previous to the current frame acquired by the acquiring unit 130A. When a frame power that is larger than or equal to the threshold TH1 was not observed in the immediately previous frame, the current frame is identified as a start frame of a speech section. When a frame power that is larger than or equal to the threshold TH1 has been observed continuously from the previous frame, the speech-section detecting unit 130C determines that a speech section is continuing and waits for an end frame of the speech section. In this case, when a frame power that is smaller than the threshold TH1 is observed while the end frame of the speech section is waited for, the speech-section detecting unit 130C identifies the current frame as the end frame of the speech section. When the start frame and the end frame are identified, the speech-section detecting unit 130C detects frames included between the start frame and the end frame as a speech section.

The acoustic-feature determining unit 130D is a processing unit that determines acoustic features. The acoustic-feature determining unit 130D is an example of a first determining unit.

In one illustrative example, the acoustic-feature determining unit 130D determines a pitch frequency in each of the frames included in the speech section detected by the speech-section detecting unit 130C. This pitch frequency is an example of acoustic features. For example, the acoustic-feature determining unit 130D may determine the pitch frequency, based on a document (D. Talkin, "A Robust Algorithm for Pitch Tracking (RAPT)," in Speech Coding & Synthesis, W. B. Kleijn and K. K. Paliwal (Eds.), Elsevier, pp. 495-518, 1995). Also, the pitch frequency may be determined using a waveform envelope method, a zero-crossing method, or another method including a cepstrum method.

The deriving unit 130E is a processing unit that derives a voice parameter. The deriving unit 130E is an example of a second determining unit. Now, a description will be given of a case in which frame power is used as merely an example of the voice parameter.

In one illustrative example, when the speech-section detecting unit 130C detects a speech section, the deriving unit 130E selects one of the frames included in the speech section. A frame selected from the frames in a speech section may hereinafter be referred to as a "selected frame". The deriving unit 130E derives a frame power in the selected frame. That is, since the strength determining unit 130B has already determined the frame power in each frame, the strength determining unit 130B may call the frame power corresponding to the selected frame from a work area or the like in which determination results are stored.

The statistical-value storage unit 130F has a storage area in which a voice-parameter statistical value is stored. In one example, when the frame power is used as the voice parameter, a frame-power maximum value S_max and the frame number of the frame in which the maximum value is observed are stored in the statistical-value storage unit 130F in association with each other. The "maximum value" as used herein refers to, for example, a maximum value of a collection whose population includes frame powers observed in the range from a first frame in which voice signal acquisition is started to the selected frame. The population may or may not include a frame not corresponding to a speech section.

The updating unit 130G is a processing unit that updates the voice-parameter statistical value stored in the statistical-value storage unit 130F.

In one illustrative example, each time the deriving unit 130E derives the frame power in the selected frame, the updating unit 130G compares the value S(n) of the frame power in the selected frame with the frame-power maximum value S_max stored in the statistical-value storage unit 130F. In this case, when the value S(n) of the frame power in the selected frame exceeds the frame-power maximum value S_max, the updating unit 130G stores, by overwriting, the value of the frame power in the selected frame and the frame number of the selected frame to the statistical-value storage unit 130F in association with each other. As a result, an update S_max←S(n) is executed.

The voice-likelihood determining unit 130H is a processing unit that determines an index indicating a talker's voice likelihood. The voice-likelihood determining unit 130H is an example of a third determining unit.

In one illustrative example, the voice-likelihood determining unit 130H determines, as a talker's voice likelihood, a relative value of the frame power in the selected frame relative to the maximum value. For example, the voice-likelihood determining unit 130H calculates a difference between the frame-power maximum value S_max stored in the statistical-value storage unit 130F and the frame power S(n) in the selected frame, that is, S_max−S(n) [dB], to thereby determine a talker's voice likelihood in the selected frame.

The weight assigning unit 130I is a processing unit that assigns a weight to each frame in a speech section.

In one illustrative example, based on a talker's voice likelihood in the selected frame, the voice likelihood being determined by the voice-likelihood determining unit 130H, the weight assigning unit 130I determines a weighting factor to be assigned to the selected frame. For example, by using the relative value, determined as the talker's voice likelihood in the selected frame, as an argument, the weight assigning unit 130I refers to a function that defines the correspondence between the voice likelihood and the weighting factor, the correspondence being illustrated in FIG. 4, or a lookup table or the like about the correspondence, to thereby determine a weighting factor w(n) to be assigned to the selected frame. The weighting factor w(n) determined in this manner is assigned to a selected frame n.

In the example illustrated in FIG. 4, when a relative value that is larger than or equal to the threshold TH3, for example, 0 dB, is determined, "1" is determined for the weighting factor for the selected frame. When a relative value that is smaller than the threshold TH2, for example, −15 dB, is determined, "0" is determined for the weighting factor for the selected frame. Also, when a relative value that is larger than or equal to the threshold TH2 and is smaller than the threshold TH3 is determined, a weighting factor that is closer to the maximum value "1" of the weighting factor is determined for a weighting factor for the selected frame as the relative value gets closer to the threshold TH3, whereas a weighting factor that is closer to the minimum value "0" of the weighting factor is determined as the relative value gets closer to the threshold TH2.

In this case, the threshold TH2 acts as a threshold for determining to which of a talker and ambient noise the sound observed in the selected frame belongs. For example, a histogram generated from the frame powers determined from respective frames from a first frame in which voice signal acquisition is started to the selected frame may be used to set the threshold TH2. For example, frequencies belonging to corresponding bins in the frame power histogram are accumulated in order from the highest to the lowest bins. A bin value of the bin at which the cumulative value of the frequencies reaches a predetermined rate, for example, 80% of the total frequency, may be set for the threshold TH2. When a value at which a predetermined rate is included from the top of frame powers observed in voice signals is set for the threshold TH2, as described above, an advantage as described below is obtained. That is, it is possible to increase the possibility that a weight that is larger than zero can be assigned to a selected frame that is still likely to include a talker's voice, and it is possible to increase the possibility that a weight of zero can be assigned to a selected frame that is highly likely to include ambient noise.

Although a case in which units of analysis of voice signals are the same between the phase at which distribution information, such as the spread of the histogram, regarding acoustic features is determined and the phase at which the distribution information is used for the weighting has been described above by way of example, the units of analysis of voice signals, for example, the section lengths of frames, may be changed between the two phases.

The distribution determining unit 130J is a processing unit that determines distribution information regarding acoustic features. The distribution determining unit 130J is an example of a fourth determining unit.

In one illustrative example, when weights are determined for all frames included in a speech section, the distribution determining unit 130J generates a histogram of pitch frequencies determined in the frames, based on the weighting factors assigned to the frames. For example, the distribution determining unit 130J adds, for each frame included in the speech section, the weighting factor assigned to the frame to a frequency corresponding to a bin to which the pitch frequency determined for the frame belongs. As a result, a pitch frequency histogram is generated. Then, the distribution determining unit 130J determines a spread of the pitch frequency histogram. For example, by referring to frequencies in the histogram, the distribution determining unit 130J determines, as the spread of the histogram, a portion of bins in which the frequencies are larger than or equal to a predetermined value. The spread of the histogram which is determined in the manner described above is output to the impression evaluation unit 130K as distribution information regarding acoustic features. Although a case in which the spread of the histogram (frequency distribution) is determined as an example of the distribution information, an average value, a minimum value, a maximum value, or the like in the histogram may also be determined as the distribution information.

The impression evaluation unit 130K is a processing unit that evaluates an impression of speech, based on the distribution information of acoustic features.

In one illustrative example, the impression evaluation unit 130K pre-holds the spread of a normal-time histogram in a work area or the like accessible by the impression evaluation unit 130K, which spread is to be compared with the spread of the histogram determined by the distribution determining unit 130J. For instance, a statistical value of the spreads of histograms in a plurality of speech sections detected from when voice signal acquisition is started until the corresponding speech section is detected, for example, a mode, an average value, or a median, is held as an example of the spread of the normal-time histogram. Upon degerming that the spread of the histogram determined by the distribution determining unit 130J is larger than the spread of the normal-time histogram, by referring to the above-described spread of the normal-time histogram, the impression evaluation unit 130K evaluates that the impression of the corresponding speech is a "good impression". Also, when the spread of the normal-time histogram and the spread of the histogram determined by the distribution determining unit 130J are equal to each other, the impression evaluation unit 130K evaluates that the impression of the corresponding speech is "normal". Also, when the spread of the histogram determined by the distribution determining unit 130J is smaller than the spread of the normal-time histogram, the impression evaluation unit 130K evaluates that the impression of the corresponding speech is a "bad impression". The evaluation result obtained from the evaluation in the manner described above is displayed on the display unit 140.

The display unit 140 is a functional unit that displays various types of information.

In one illustrative example, the display unit 140 may be implemented by hardware, such as a liquid-crystal display or an organic electroluminescent (EL) display, or may be implemented as a touch panel through integration with an input unit (not illustrated). In addition to such an implementation in which the display is realized with light emission, the display unit 140 may also be implemented as a projector that realizes the display with projection. For example, in accordance with an instruction from the voice processing program, the display unit 140 displays the evaluation result regarding the impression of the speech.

Figure 7A:
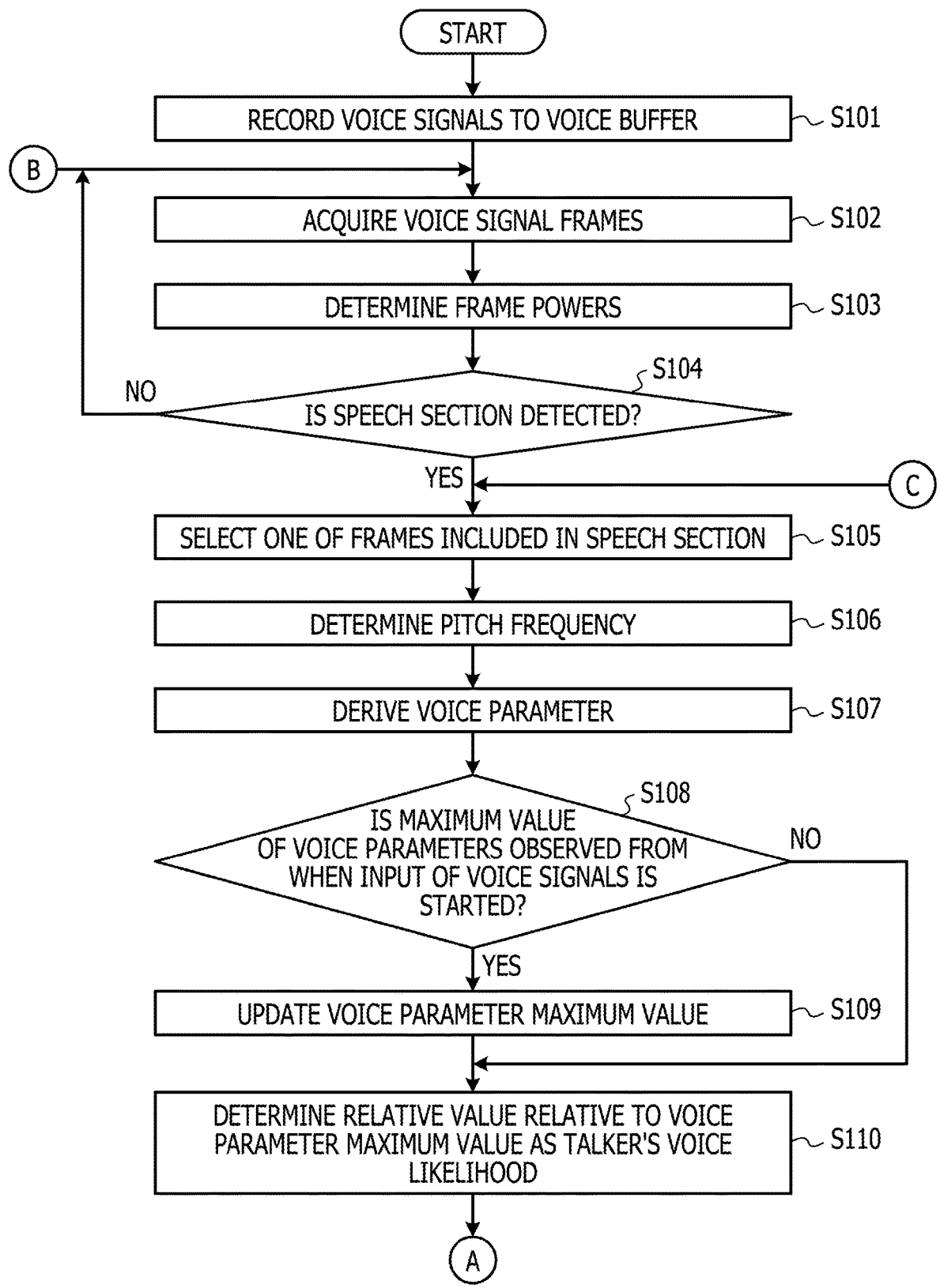
FIGS. 7A and 7B are a flowchart illustrating a procedure of voice processing according to the first embodiment.
Figure 7B:
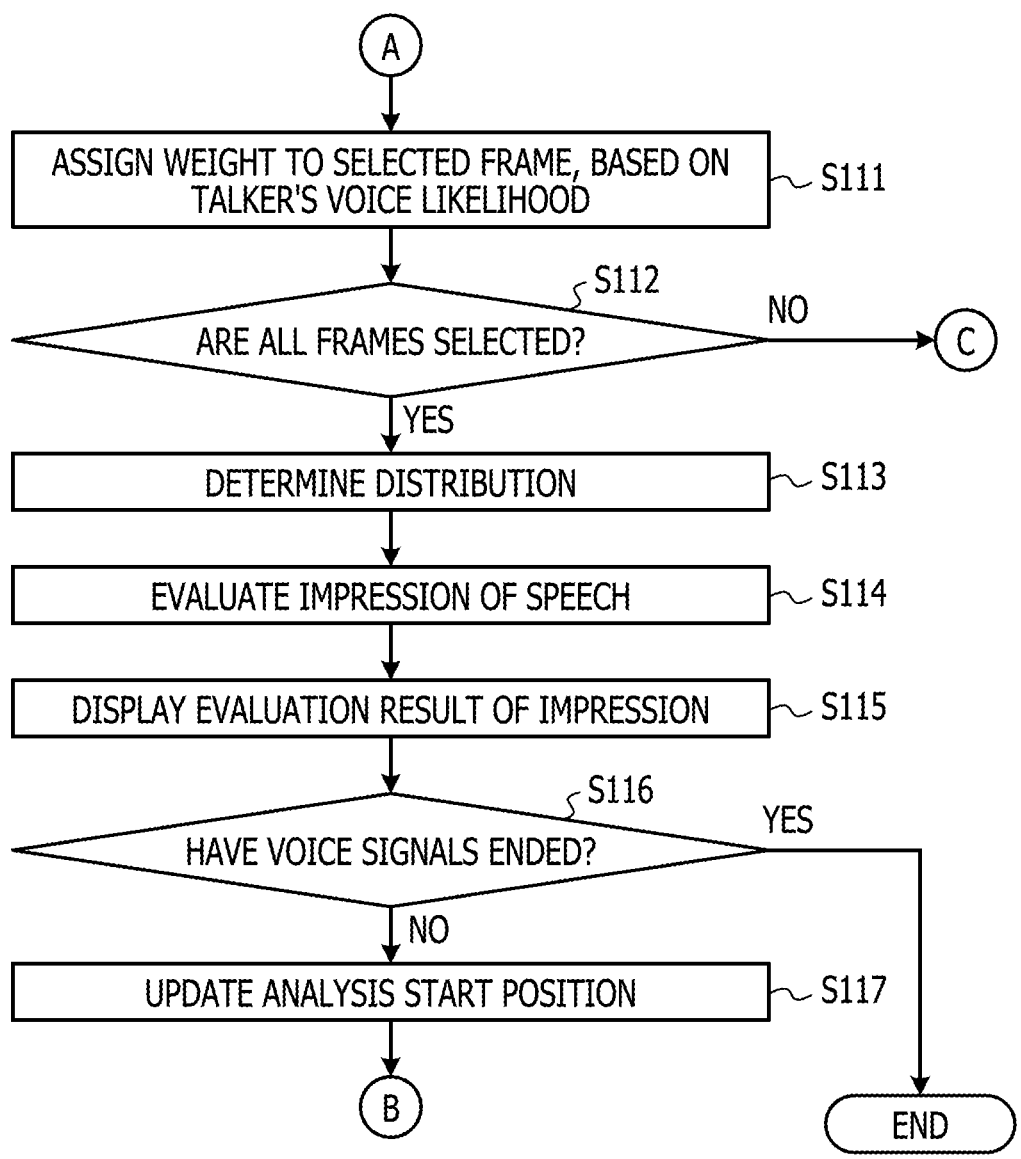

Next, a description will be given of a flow of processing in the voice processing apparatus according to the present embodiment. FIG. 7 (i.e., FIGS. 7A and 7B) is a flowchart illustrating a procedure of voice processing according to the first embodiment. In one example, the voice processing may be executed, for example, when accumulation of voice signals in the voice buffer 120A is started upon start of a call.

As illustrated in FIG. 7, when the receiving unit 110 records voice signals to the voice buffer 120A (step S101), the acquiring unit 130A acquires voice signal frames from the voice buffer 120A (step S102). Subsequently, the strength determining unit 130B determines frame powers S(n) of the voice signal frames acquired in step S102 (step S103).

Subsequently, when the speech-section detecting unit 130C detects a speech section (Yes in step S104), one of the frames included in the speech section is selected (step S105). Subsequently, the acoustic-feature determining unit 130D determines a pitch frequency in the frame selected in step S105 (step S106). The above-described processes in steps S102 and S103 are executed until a speech section is detected (No in step S104).

Also, the deriving unit 130E derives a frame power corresponding to the frame selected in step S105 by calling the frame power from the work area in which the determination results are stored by the strength determining unit 130B (step S107).

The updating unit 130G then compares the value S(n) of the frame power in the selected frame, the frame power being derived in step S107, with the frame-power maximum value S_max stored in the statistical-value storage unit 130F (step S108).

If the value S(n) of the frame power in the selected frame exceeds the frame-power maximum value S_max (Yes in step S108), the updating unit 130G saves, by overwriting, the value S(n) of the frame power in the selected frame and the frame number in the selected frame to the statistical-value storage unit 130F in association with each other (step S109). If the value S(n) of the frame power in the selected frame does not exceed the frame-power maximum value S_max (No in step S108), the process in steps S109 is skipped.

Thereafter, the voice-likelihood determining unit 130H determines a talker's voice likelihood in the selected frame by calculating a difference between the frame-power maximum value S_max stored in the statistical-value storage unit 130F and the frame power S(n) in the selected frame, that is, S_max−S(n) [dB] (step S110).

Subsequently, the weight assigning unit 130I assigns the weighting factor w(n) to the selected frame in accordance with a relative value determined as the talker's voice likelihood in the selected frame in step S110 (step S111).

Then, the processes in steps S105 to S111 are repeatedly executed until all frames included in the speech section are selected (No in step S112). Thereafter, if all frames included in the speech section are selected (Yes in step S112), the distribution determining unit 130J determines a pitch frequency histogram by adding, for each frame in the speech section, the weighting factor assigned to the frame to a frequency corresponding to a bin to which the pitch frequency determined for the frame belongs (step S113).

Subsequently, based on the spread of the histogram determined in step S113, the impression evaluation unit 130K evaluates an impression of the speech (step S114). The impression evaluation unit 130K then causes the display unit 140 to display an evaluation result of the impression evaluated in step S114 (step S115).

Thereafter, a frame that is an analysis start position is updated (step S117) until the voice signal frames end (No in step S116), and the processes in steps S102 to S115 are executed. When the voice signal frame end (Yes in step S116), the processing ends.

As described above, the voice processing apparatus 100 according to the present embodiment determines, as a talker's voice likelihood, a relative value relative to a voice-parameter statistical value determined from voice signal frames and generates a pitch frequency distribution by changing a frequency weight assigned to the frames in accordance with the voice likelihood. This makes it possible to suppress or reduce pitch-frequency detection error due to ambient noise, thus making it possible to suppress or reduce a situation in which speech observed from a talker is erroneously determined to be brighter voice than the actual voice. Therefore, the voice processing apparatus 100 according to the present embodiment makes it possible to accurately estimate an impression of speech.

Second Embodiment

Although the above description has been given of an embodiment of the apparatus disclosed herein, the present disclosure may be implemented in various different modes other than the above-described embodiment. Hence, another embodiment encompassed by the present disclosure will be described below.

(1) Application Example of Voice Parameter

Although a case in which frame power derived from voice signals is used as one example of the voice parameter to determine a talker's voice likelihood has been described above by way of example in the first embodiment, another voice parameter other than the frame power may be used to determine a talker's voice likelihood.

(1.1) SNR

The voice processing apparatus 100 may use an SNR as another example of the voice parameter to determine a talker's voice likelihood. For example, each time the acquiring unit 130A acquires a voice signal frame n, the deriving unit 130E determines, for each frame, the SNR in the frame while updating a noise level.

This processing will now be described specifically. The deriving unit 130E updates a noise level N(n) in accordance with a speech-section detection result obtained by the speech-section detecting unit 130C. For example, for updating the noise level N(n) of a frame n for which the speech-section detecting unit 130C determined that the frame power S(n) is larger than or equal to the threshold TH1, the deriving unit 130E updates the noise level N(n) in accordance with equation (2) below. For updating the noise level N(n) of a frame n for which the speech-section detecting unit 130C determined that the frame power S(n) is smaller than the threshold TH1, the deriving unit 130E updates the noise level N(n) in accordance with equation (3) below. In equations (2) and (3) below, "coef" represents a forgetting coefficient, and for example, a value "0.9" is used therefor.

$$N(n)=N(n-1)*\text{coef}+S(n)*(1-\text{coef}) \qquad (2)$$

$$N(n)=N(n-1) \qquad (3)$$

That is, for a frame n corresponding to a speech section, smoothing is executed between a frame power S(1) in the frame n and a noise level N(n−1) in the frame n−1 immediately previous to the frame n, in accordance with the forgetting coefficient. In this case, since the noise level N(n−1) in the immediately previous frame n−1 has greater weight in the update than the frame power S(1) in the frame n, a rapid change in the frame power can be output smoothly.

Also, for a frame n that does not correspond to a speech section, the noise level N(n−1) in the immediately previous frame n−1 is directly succeeded.

Subsequently, the deriving unit 130E determines SNR(n) in the frame n by calculating a difference between the frame power S(n) and the noise level N(n) in accordance with equation (4) below. Although a case in which the SNR is determined for each frame has been described above by way of example, the SNR determination may be executed on only frames included in a speech section, while executing the noise-level update for each frame.

$$SNR(n)=S(n)-N(n) \quad (4)$$

After SNR(n) is determined as described above, the voice-likelihood determining unit 130H determines, as a talker's voice likelihood, a relative value of the SNR in a selected frame relative to the maximum value. In this case, when the SNR is used as the voice parameter, a maximum value SNR_max of SNRs observed in the range from a first frame in which voice signal acquisition is started to the selected frame and the frame number of a frame in which the maximum value is observed are stored in the statistical-value storage unit 130F in association with each other. By referring to such a statistical-value storage unit 130F, the voice-likelihood determining unit 130H determines a talker's voice likelihood in the selected frame by calculating a difference between the SNR maximum value SNR_max stored in the statistical-value storage unit 130F and SNR(n) in the selected frame, that is, SNR_max−SNR(n).

After the voice likelihood is determined, the voice processing apparatus 100 may execute processing that is analogous to the processing described above in the first embodiment. Although a case in which a correspondence between the relative value of frame power and the weighting factor is referred to for assignment of the weighting factor has been described above by way example in the first embodiment, the weighting factor may be assigned to each frame included in a speech section by referring to a correspondence between the relative value of the SNR and the weighting factor.

(1.2) Spectral Power

The voice processing apparatus 100 may use spectral power derived from voice signals, as another example of the voice parameter, to determine a talker's voice likelihood. For example, each time the acquiring unit 130A acquires a voice signal frame n, the deriving unit 130E determines a spectral power in each voice signal frame.

This determination will now be described specifically. The deriving unit 130E determines a spectrum P(f, n) by applying a Fourier transform, typified by a fast Fourier transform (FFT), to the frame n of the voice signal C. Subsequently, the deriving unit 130E determines an average spectral power P_ave(n) in a predetermined band in accordance with equation (5). In equation (5), "f" represents a frequency. A frequency range corresponding to voice is set for the predetermined band. For example, 100 Hz is set for a lower-limit value Fmin of boundary values of the frequency range, and 2000 Hz is set for an upper-limit value Fmax of the boundary values. The determination of the average spectral power P_ave(n) may or may not be executed on all voice signal frames and may be executed on only frames included in a speech section.

$$P\_ave(n) = \frac{1}{(F\max - F\min)} \sum_{t=Fmin}^{Fmax} P(f, n) \quad (5)$$

After the average spectral power P_ave(n) is determined as described above, the voice-likelihood determining unit 130H determines, as a talker's voice likelihood, a relative value of the average spectral power in the selected frame relative to the maximum value. In this case, when the average spectral power is used as the voice parameter, a maximum value P_ave_max of the average power of spectra observed in the range from a first frame in which voice signal acquisition is started to the selected frame and the frame number of a frame in which the maximum value is observed are stored in the statistical-value storage unit 130F in association with each other. By referring to such a statistical-value storage unit 130F, the voice-likelihood determining unit 130H determines a talker's voice likelihood in the selected frame by calculating a difference between the maximum value P_ave_max of the average spectral power, the maximum value P_ave_max being stored in the statistical-value storage unit 130F, and P_ave(n) in the selected frame, that is, P_ave_max−P_ave(n).

After the voice likelihood is determined, the voice processing apparatus 100 may execute processing that is analogous to the processing described above in the first embodiment. Although a case in which a correspondence between the relative value of frame power and the weighting factor is referred to for assignment of the weighting factor has been described above by way example in the first embodiment, the weighting factor may be assigned to each frame included in a speech section by referring to a correspondence between the relative value of the average spectral power and the weighting factor.

(1.3) Autocorrelation Coefficient

The voice processing apparatus 100 may use an autocorrelation coefficient derived from voice signals, as another example of the voice parameter, to determine a talker's voice likelihood. For example, each time the acquiring unit 130A acquires a voice signal frame n, the deriving unit 130E determines an autocorrelation coefficient for each voice signal frame.

This determination will now be described specifically. The deriving unit 130E determines an autocorrelation coefficient for the frame n of the voice signal C in accordance with equation (6). That is, while shifting a duplicated waveform obtained by duplicating the waveform of a frame N with respect to the original waveform in the frame n, the deriving unit 130E determines a coefficient of correlation between the original waveform in the frame n and the duplicated waveform in the frame n, that is, an autocorrelation coefficient, for each shift width j. In addition, the deriving unit 130E extracts an autocorrelation coefficient AC(n), which is the largest in the frame n, of the autocorrelation coefficients determined for the respective shift widths j. The determination of the largest autocorrelation coefficient AC(n) may or may not be executed on all voice signal frames and may be executed on only frames included in a speech section.

$$AC(n) = \max_{j=1 \sim K} \left\{ \sum_{t=n*M}^{(n+1)*M-1} C(t) \cdot C(t+j) \right\} \quad (6)$$

After the largest autocorrelation coefficient AC(n) is determined as described above, the voice-likelihood determining unit 130H determines, as a talker's voice likelihood, the relative value of the largest autocorrelation coefficient in the selected frame relative to the maximum value. In this case, when the largest autocorrelation coefficient in the selected frame is used as the voice parameter, an observed maximum value AC_max, which is much the largest in observation history, of the largest autocorrelation coefficients observed in the range from a first frame in which voice signal acquisition is started to the selected frame and the frame number of a frame in which the observed maximum value is observed are stored in the statistical-value storage unit 130F in association with each other. By referring to such a statistical-value storage unit 130F, the voice-likelihood determining unit 130H determines a talker's voice likelihood in the selected frame by calculating a difference between the observed maximum value AC_max of the largest autocorrelation coefficients in the frames, the observed maximum value AC_max being stored in the statistical-value storage unit 130F, and the largest autocorrelation coefficient AC(n) in the selected frame, that is, AC_max−AC(n).

After the voice likelihood is determined, the voice processing apparatus 100 may execute processing that is analogous to the processing described above in the first embodiment. Although a case in which a correspondence between the relative value of frame power and the weighting factor is referred to for assignment of the weighting factor has been described above by way example in the first embodiment, the weighting factor may be assigned to each frame included in a speech section by referring to a correspondence between the relative value of the largest autocorrelation coefficient and the weighting factor.

(1.4) Pitch Frequency

The voice processing apparatus 100 may use a pitch frequency derived from voice signals, as another example of the voice parameter, to determine a talker's voice likelihood. For example, the deriving unit 130E determines a mode of pitch frequencies, each time the acquiring unit 130A acquires a voice signal frame n. The term "mode" as used herein refers to, for example, a mode of a collection whose population includes pitch frequencies observed in the range from a first frame in which voice signal acquisition is started to the selected frame. This population may or may not include a frame not corresponding to a speech section and the mode determination may be performed on only frames included in a speech section.

Figure 8:
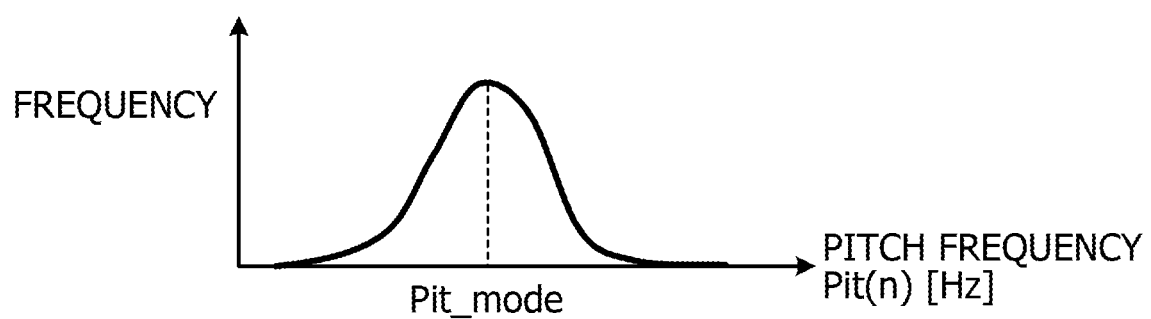
FIG. 8 illustrates an example of a mode of pitch frequencies.

This processing will now be described specifically. For example, the deriving unit 130E generates a histogram in which pitch frequencies observed in the range from the first frame in which voice signal acquisition is started to the selected frame are a population. That is, the deriving unit 130E generates a histogram by incrementing, for each frame, a frequency in a bin to which a pitch frequency Pit(n) determined from the frame belongs. FIG. 8 illustrates an example of a mode of pitch frequencies. In the graph illustrated in FIG. 8, the vertical axis represents a frequency, for example, the number of frames, and the horizontal axis represents a pitch frequency (Hz) bin. As illustrated in FIG. 8, the pitch frequency in a bin to which a frequency having the largest value belongs of bins included in the histogram is determined to be a mode Pit_mode.

After the mode Pit_mode of the pitch frequencies of spectra is determined as described above, the voice-likelihood determining unit 130H determines, as a talker's voice likelihood, a relative value of the pitch frequency in the selected frame relative to the mode. In this case, when the pitch frequency is used as the voice parameter, each time the deriving unit 130E determines the mode of pitch frequencies, the mode of the latest pitch frequency is saved to the statistical-value storage unit 130F by overwriting. By referring to such a statistical-value storage unit 130F, the voice-likelihood determining unit 130H calculates the ratio of the pitch-frequency mode Pit_mode stored in the statistical-value storage unit 130F versus the pitch frequency Pit(n) in the selected frame n, that is, "Pit(n)/Pit_mode", to thereby determine a talker's voice likelihood in the selected frame.

Subsequently, based on the talker's voice likelihood in the selected frame, the voice likelihood being determined by the voice-likelihood determining unit 130H, the weight assigning unit 130I determines a weighting factor to be assigned to the selected frame. For example, by using the relative value, determined as the talker's voice likelihood in the selected frame, as an argument, the weight assigning unit 130I refers to a function that defines a correspondence between the voice likelihood and the weighting factor, the correspondence being illustrated in FIG. 9, or a lookup table or the like about the correspondence, to thereby determine a weighting factor w(n) to be assigned to the selected frame n.

Figure 9:
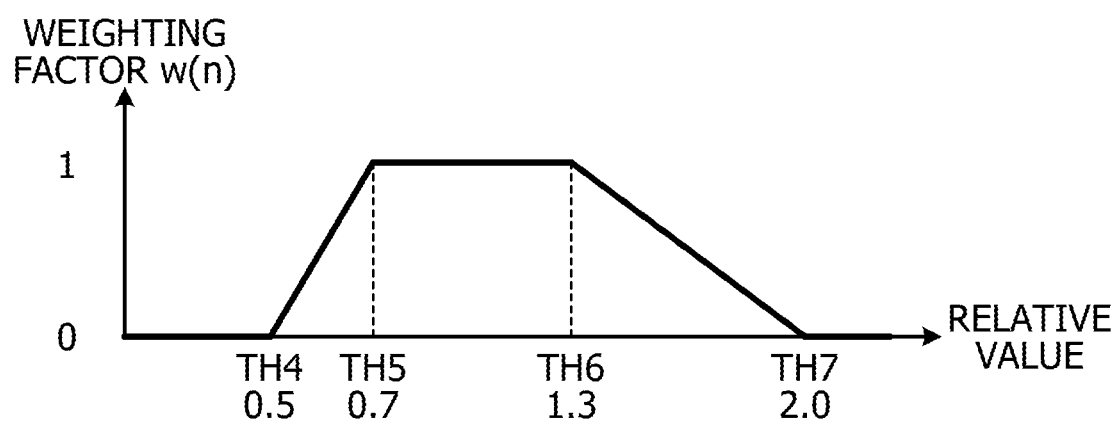
FIG. 9 illustrates an example of a graph indicating a correspondence between voice likelihood and the weighting factor.

FIG. 9 illustrates an example of a graph indicating a correspondence between voice likelihood and the weighting factor. The vertical axis in the graph illustrated in FIG. 9 represents the weighting factor, and for example, a value normalized to 0 to 1 is used therefor. The horizontal axis in the graph illustrated in FIG. 9 represents the relative value of a pitch frequency. The correspondence illustrated in FIG. 9 is set according to a knowledge that a frequency at which a pitch frequency corresponding to a talker is observed in voice signals is sufficiently larger than a frequency at which a pitch frequency corresponding to ambient noise is observed in voice signals. In other words, the possibility that the pitch frequency determined in the selected frame n is a component corresponding to a talker increases, as the relative value Pit(n)/Pit_mode gets closer to "1", whereas the possibility that the pitch frequency determined in the selected frame n is a component corresponding to ambient noise increases, as the relative value Pit(n)/Pit_mode gets farther from "1", and this qualitative relationship is used as a reference for the correspondence setting.

In the example illustrated in FIG. 9, when a relative value that is smaller than a threshold TH4, for example, 0.5, is determined, "0" is determined for a weighting factor for the selected frame. In addition, when a relative value that is larger than or equal to a threshold TH7, for example, 2.0, is determined, "0" is also determined for a weighting factor for the selected frame. When a relative value in a range that is larger than or equal to a threshold TH5 and that is smaller than a threshold TH6, that is, 0.7≤"relative value"<1.3, is determined, "1" is determined for a weighting factor for the selected frame. Also, when a relative value that is larger than or equal to the threshold TH4 and is smaller than the threshold TH5, that is, 0.5≤"relative value"<0.7, is determined, a weighting factor that is closer to the minimum value "0" of the weighting factor is determined as a weighting factor for the selected frame, as the relative value gets closer to the threshold TH4, whereas a weighting factor that is closer to the maximum value "1" of the weighting factor is determined, as the relative value gets closer to the threshold TH5. In addition, when a relative value that is larger than or equal to the threshold TH6 and is smaller than the threshold TH7, that is, 1.3≤"relative value"<2.0, is determined, a weighting factor that is closer to the maximum value "1" of the weighting factor is determined as a weighting factor for the selected frame, as the relative value gets closer to the threshold TH6, whereas a weighting factor that is closer to the minimum value "0" of the weighting factor is determined, as the relative value gets closer to the threshold TH7. The weighting factor w(n) determined in the manner described manner is assigned to the selected frame n.

Thereafter, when weights for all frames included in the speech section are determined, the distribution determining unit 130J generates a histogram of pitch frequencies determined in the frames, based on the weighting factors assigned to the frames. In subsequent processing, processing that is analogous to the processing described above in the first embodiment is executed.

(1.5) Formants

The voice processing apparatus 100 may use formant frequencies derived from voice signals, as another example of the voice parameter, to determine a talker's voice likelihood. For example, the deriving unit 130E determines an average value of formant frequencies, each time the acquiring unit 130A acquires a voice signal frame n. The "average value" as used herein refers to, for example, an average value of a collection whose population includes formant frequencies observed in the range from a first frame in which voice signal acquisition is started to the selected frame. This population may or may not include a frame not corresponding to a speech section and the average-value determination may be performed on only frames included in a speech section.

This processing will now be described specifically. Each time the acquiring unit 130A acquires a voice signal frame n, the deriving unit 130E may extract a plurality of peaks by performing linear prediction coding analysis. Of these peaks, the peaks in ascending order of frequency are sequentially referred to as a "first formant frequency F1" and a "second formant frequency F2". Such formant frequency determination may employ, for example, the technology disclosed in Patent Document (Japanese Laid-open Patent Publication No. 62-54297). Although a case in which two formant frequencies are determined have been described as merely an example, three or more formant frequencies may be determined.

By using a population including a first formant frequency F1(n) and a second formant frequency F2(n) in a frame n which are determined in the manner described above and first formant frequencies F1 and second formant frequencies F2 determined in frames 1 to n−1 from when voice signal acquisition is started until the frame n is acquired, the deriving unit 130E determines an average value F1_ave of the first formant frequencies and an average value F2_ave of the second formant frequencies in accordance with equations (7) and (8) below. When the formant frequencies are used as the voice parameter, each time the deriving unit 130E determines the average value F1_ave of the first formant frequencies and the average value F2_ave of the second formant frequencies, the latest average value F1_ave of the first formant frequencies and the latest average value F2_ave of the second formant frequencies are saved to the statistical-value storage unit 130F by overwriting.

$$F1\_ave = \frac{1}{n}\sum_{i=1}^{n} F1(i) \quad (7)$$

$$F2\_ave = \frac{1}{n}\sum_{i=1}^{n} F2(i) \quad (8)$$

After the average value F1_ave of the first formant frequencies and the average value F2_ave of the second formant frequencies are determined in the manner described above, the voice-likelihood determining unit 130H refers to the statistical-value storage unit 130F to determine the relative value (that is, F1(n)/F1_ave) of the first formant frequency in a selected frame relative to the average value and to determine the relative value (that is, F2(n)/F2_ave) of the second formant frequency in the selected frame relative to the average value. In addition, the voice-likelihood determining unit 130H determines, as a talker's voice likelihood, a formant-relative-value ratio of the relative value of the first formant frequency in the selected frame relative to the average value versus the relative value of the second formant frequency in the selected frame relative to the average value, that is, {[(F1(n)/F1_ave)+(F2(n)/F2_ave)]×1/2}.

Subsequently, based on the talker's voice likelihood in the selected frame, the voice likelihood being determined by the voice-likelihood determining unit 130H, the weight assigning unit 130I determines a weighting factor to be assigned to the selected frame. For example, by using the formant relative value rate, determined as the talker's voice likelihood in the selected frame, as an argument, the weight assigning unit 130I refers to a function that defines a correspondence between the voice likelihood and the weighting factor, the correspondence being illustrated in FIG. 10, or a lookup table or the like about the correspondence, to thereby determine a weighting factor w(n) to be assigned to the selected frame n.

Figure 10:
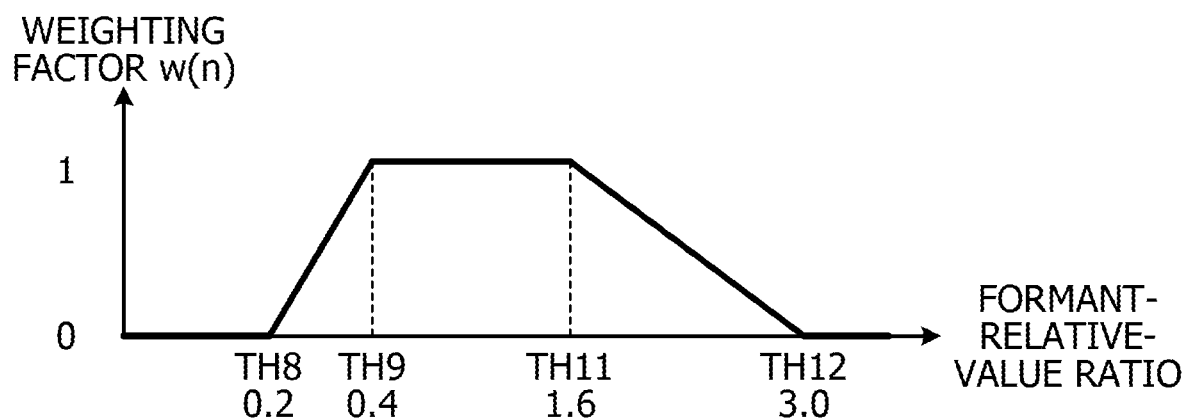
FIG. 10 illustrates an example of a graph indicating a correspondence between voice likelihood and the weighting factor.

FIG. 10 illustrates an example of a graph indicating a correspondence between voice likelihood and the weighting factor. The vertical axis in the graph illustrated in FIG. 10 represents a weighting factor, and for example, a value normalized to 0 to 1 is used therefor. The horizontal axis in the graph illustrated in FIG. 10 represents a relative value of a pitch frequency. The correspondence illustrated in FIG. 10 is set according to a knowledge that a frequency at which a formant frequency corresponding to a talker is observed in voice signals is sufficiently larger than a frequency at which a formant frequency corresponding to ambient noise is observed. In other words, the possibility that the pitch frequency determined in the selected frame n is a component corresponding to a talker increases, as the formant-relative-value ratio gets closer to "1", whereas the possibility that the pitch frequency determined in the selected frame n is a component corresponding to ambient noise increases, as the formant-relative-value ratio gets farther from "1", and this qualitative relationship is used as a reference for the correspondence setting.

In the example illustrated in FIG. 10, when a formant-relative-value ratio that is smaller than a threshold TH8, for example, 0.2, is determined, "0" is determined for a weighting factor for the selected frame. In addition, when a formant-relative-value ratio that is larger than or equal to a threshold TH12, for example, 3.0, is determined, "0" is also determined for a weighting factor for the selected frame. When a formant-relative-value ratio in a range that is larger than or equal to a threshold TH9 and that is smaller than a threshold TH11, that is, 0.4≤"formant-relative-value ratio"<1.6 is determined, "1" is determined for a weighting factor for the selected frame. Also, when a formant-relative-value ratio that is larger than or equal to the threshold TH8 and is smaller than the threshold TH9, that is, 0.2≤"formant-relative-value ratio"<0.4, is determined, a weighting factor that is closer to the minimum value "0" of the weighting factor is determined as a weighting factor for the selected frame, as the formant-relative-value ratio gets closer to the threshold TH8, and a weighting factor that is closer to the maximum value "1" of the weighting factor is determined, as the formant-relative-value ratio gets closer to the threshold TH9. In addition, when a formant-relative-value ratio that is larger than or equal to the threshold TH11 and is smaller than the threshold TH12, that is, 1.6≤"formant-relative-value ratio"<3.0, is determined, a weighting factor that is closer to the maximum value "1" of the weighting factor is determined as a weighting factor for the selected frame, as the formant-relative-value ratio gets closer to the threshold TH11, and a weighting factor that is closer to the minimum value "0" of the weighting factor is determined, as the formant-relative-value ratio gets closer to the threshold TH12. The weighting factor w(n) determined in the manner described above is assigned to the selected frame n.

Thereafter, when weights are determined for all frames included in the speech section, the distribution determining unit 130J generates a histogram of pitch frequencies determined in the frames, based on the weighting factors assigned to the frames. In subsequent processing, processing that is analogous to the processing described above in the first embodiment is executed.

(2) Application Example of Display of Evaluation Result

Although a case in which an evaluation result of an impression is displayed as one of the evaluation results "good impression", "normal", and "bad impression" has been described above in the first embodiment, the evaluation result may also be output as an evaluation value. For example, when a spread included in statistic information is larger than the spread of the normal-time histogram, the impression evaluation unit 130K evaluates that the evaluation value is 1. Also, when the spread of the normal-time histogram and the spread included in the statistic information are equal to each other, the impression evaluation unit 130K evaluates that the evaluation value is 0. In addition, when the spread included in the statistic information is smaller than the spread of the normal-time histogram, the impression evaluation unit 130K evaluates that the evaluation value is −1.

In addition, although an example in which the impression evaluation result is displayed on the display unit 140 for each speech section has been described above in the first embodiment, time-series changes in the impression evaluation result may also be displayed on the display unit 140. Specifically, each time the impression evaluation unit 130K determines an evaluation value of an impression in a speech section, the impression evaluation unit 130K executes smoothing between the evaluation value of the impression in the speech section and an evaluation value evaluated before the speech section was evaluated. For example, the impression evaluation unit 130K smooths the evaluation values in accordance with equation (9) below. In this case, "score(n)" in equation (9) represents a pre-smoothing evaluation value. Also "score'(n)" represents a post-smoothing evaluation value. In addition, "score'(n−1)" represents a post-smoothing value determined in a last-but-one speech.

$$\text{score}'(n) = \text{score}'(n-1) \times \text{coef} + \text{score}(n) \times (1-\text{coef}) \quad (9)$$

Figure 11:
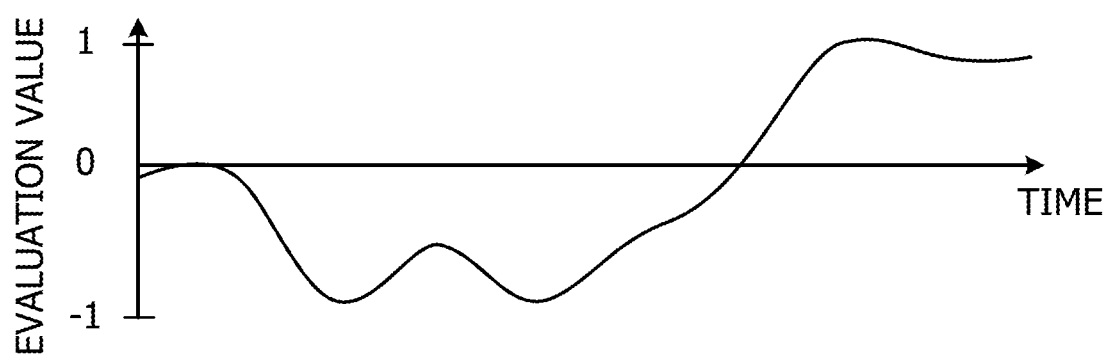
FIG. 11 illustrates an example of time-series changes in the evaluation value of an impression.

Each time the impression evaluation unit 130K determines a post-smoothing evaluation value, the impression evaluation unit 130K causes the display unit 140 to display the evaluation value. FIG. 11 illustrates an example of time-series changes in the evaluation value of an impression. The horizontal axis in the graph illustrated in FIG. 11 represents time, and the vertical axis represents a post-smoothing evaluation value. As illustrated in FIG. 11, displaying the time-series changes in the evaluation value of an impression by using a curved line graph allows the talker 1b or the like to recognize how the evaluation value transitions with time.

(3) Other Implementations

The implementation described in the first embodiment described above is an example in which the functions of the voice processing apparatus according to the first embodiment is implemented in a computer system, and other implementations may also be employed.

(3.1) Client Server System

Figure 12:
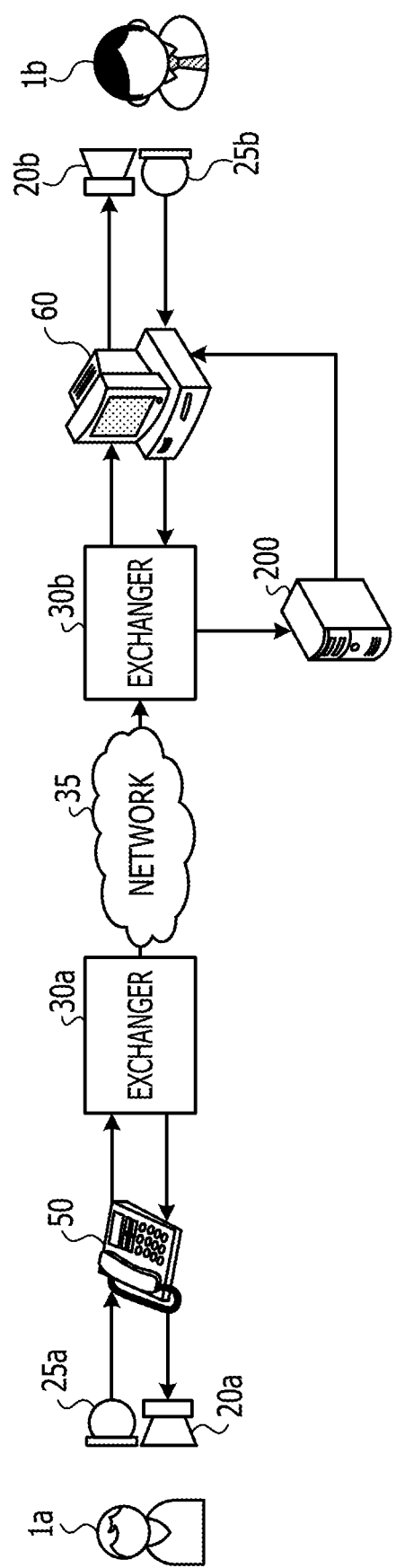
FIG. 12 illustrates an example of another implementation.

FIG. 12 illustrates an example of another implementation. As illustrated in FIG. 12, in this implementation, a system includes a phone 50, exchanges 30a and 30b, an operator terminal 60, and a voice processing apparatus 200. The phone 50 is connected to a speaker 20a and a microphone 25a. The operator terminal 60 is connected to a speaker 20b and a microphone 25b.

The exchanges 30a and 30b are connected to each other through a network 35. The exchanges 30a and 30b are apparatuses that relay voice signals transmitted from the phone 50 or the operator terminal 60.

The phone 50 acquires voice signals of the talker 1a via the microphone 25a. The phone 50 transmits the acquired voice signals of the talker 1a to the operator terminal 60. The voice signals forwarded to the operator terminal 60 are also transmitted to the voice processing apparatus 200 that accommodates the operator terminal 60 as a client terminal. The voice signals transmitted to the operator terminal 60 are output from the speaker 20b.

The operator terminal 60 acquires voice signals of the talker 1b via the microphone 25b. The operator terminal 60 transmits the acquired voice signals of the talker 1b to the phone 50. The voice signals transmitted to the phone 50 are output from the speaker 20a. In accordance with an instruction from the voice processing apparatus 200, the operator terminal 60 may display an evaluation result of an impression of speech.

The voice processing apparatus 200 illustrated in FIG. 12 may be implemented as a server apparatus that accommodates the operator terminal 60 as a client terminal and that provides a voice processing service for acquiring, from the exchange 30b, voice signals of the talker 1a about a call forwarded to the operator terminal 60 and for causing the operator terminal 60 to display the evaluation result of the impression of the speech.

As described above, the voice processing apparatus 200 may also be implemented as a client server system that provides functions that are the same as or similar to those in the first embodiment described above. In this case, the voice processing apparatus 200 can also provide the above-described voice processing service by having functional units that are the same as or similar to those in the voice processing apparatus 100 illustrated in FIG. 6.

(3.2) Implementation into Meeting System

Figure 13:
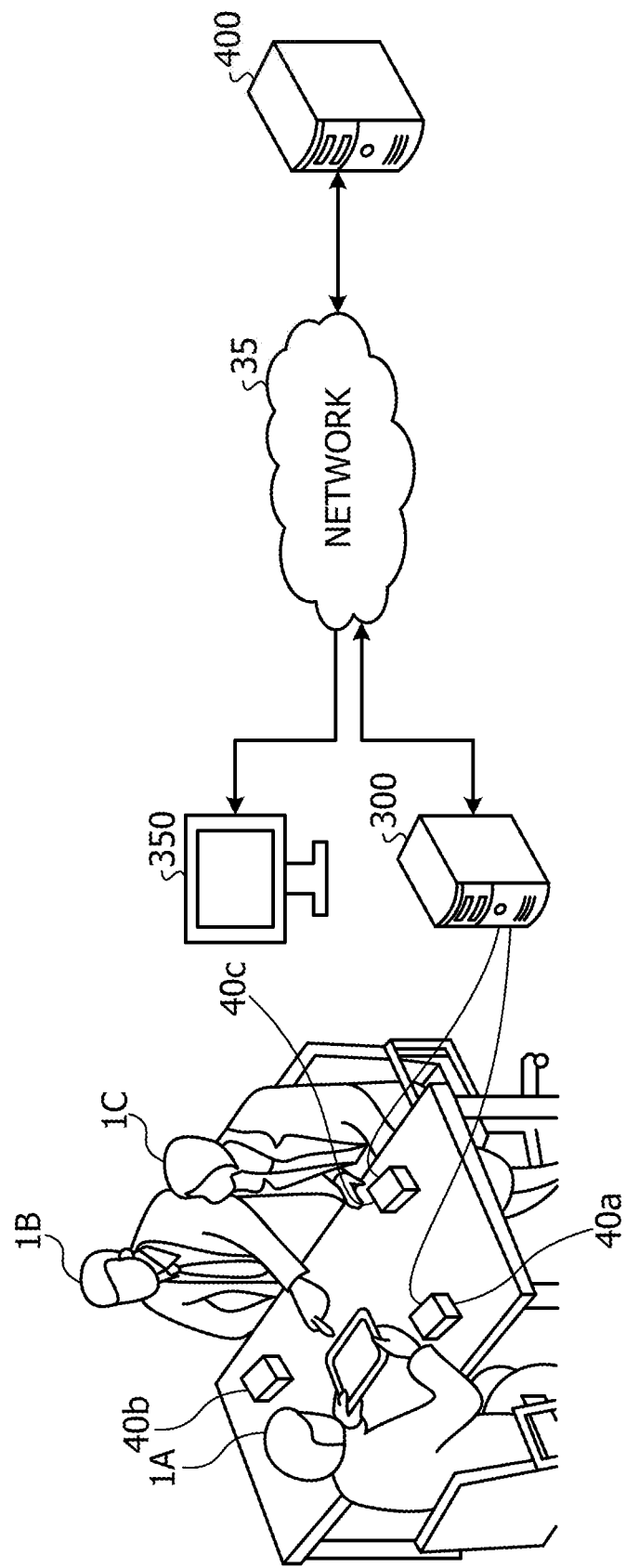
FIG. 13 illustrates an example of another implementation.

FIG. 13 illustrates an example of another implementation. As illustrated in FIG. 13, in this implementation, a system includes microphones 40a, 40b, and 40c, collecting equipment 300, a display device 350, and a voice processing apparatus 400. The collecting equipment 300 is connected to the voice processing apparatus 400 through a network 35. Although not illustrated, the voice processing apparatus 400 may be constituted by one or more servers on a cloud.

Voice of a talker 1A is picked up by the microphone 40a, and voice signals resulting from the pickup are output to the collecting equipment 300. Voice of a talker 1B is picked up by the microphone 40b, and voice signals resulting from the pickup are output to the collecting equipment 300. Voice of a talker 1C is picked up by the microphone 40c, and voice signals resulting from the pickup are output to the collecting equipment 300.

In the description below, voice signals from the talker 1A are referred to as "first voice signals", voice signals from the talker 1B are referred to as "second voice signals", and voice signals from the talker 1C re referred to as "third voice signals", when they are specifically distinguished.

For example, talker information of the talker 1A is appended to the first voice signals. The talker information is information for uniquely identifying the corresponding talker. Talker information of the talker 1B is appended to the second voice signals. Talker information of the talker 1C is appended to the third voice signals.

The collecting equipment 300 is an apparatus that collects the first, second, and third voice signals. The collecting equipment 300 also transmits the first, second, and third voice signals to the voice processing apparatus 400.

Figure 14:
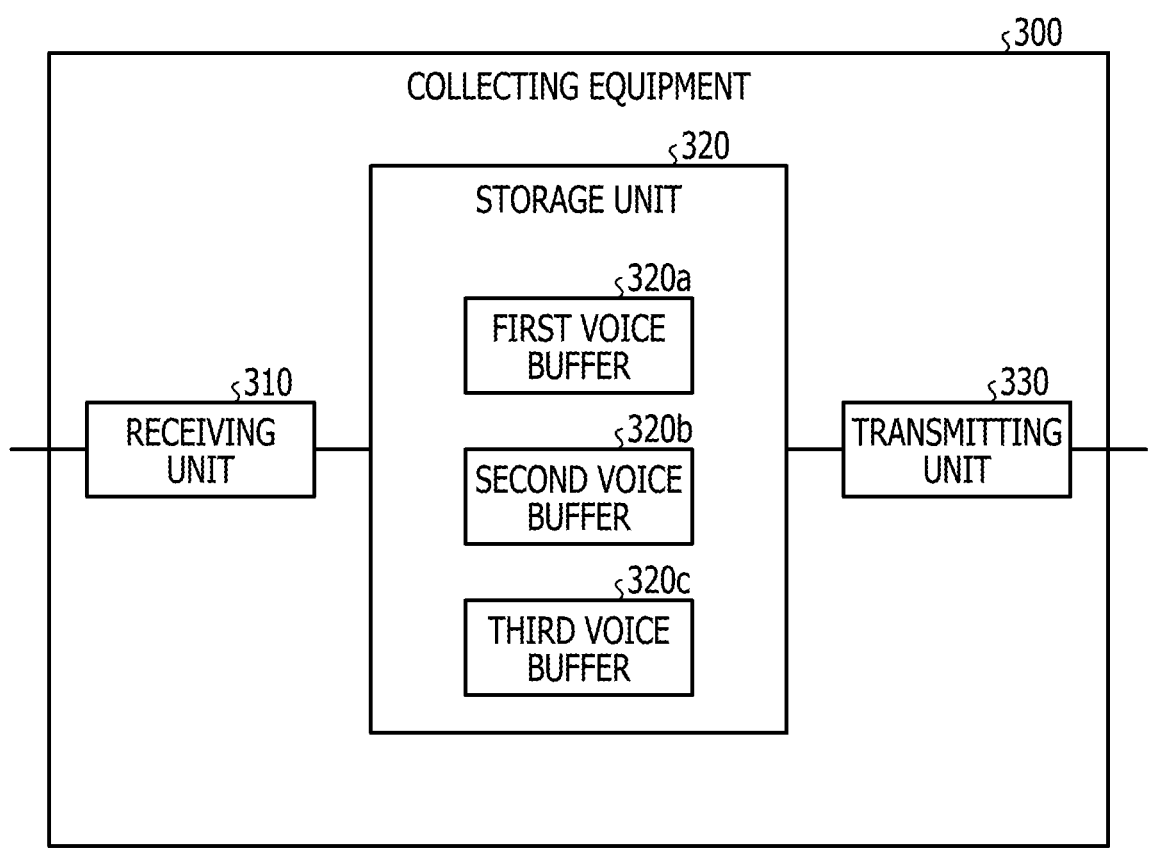
FIG. 14 is a block diagram illustrating an example of the functional configuration of collecting equipment.

FIG. 14 is a block diagram illustrating an example of the functional configuration of the collecting equipment. As illustrated in FIG. 14, the collecting equipment 300 includes a receiving unit 310, a storage unit 320, and a transmitting unit 330.

The receiving unit 310 is a processing unit that receives the first, second, and third voice signals from the corresponding microphones 40a, 40b, and 40c. The receiving unit 310 records the first voice signals to a first voice buffer 320a. The receiving unit 310 records the second voice signals to a second voice buffer 320b. The receiving unit 310 records the third voice signals to a third voice buffer 320c.

The storage unit 320 includes the first voice buffer 320a, the second voice buffer 320b, and the third voice buffer 320c. The storage unit 320 corresponds to a semiconductor memory element, such as a RAM, a ROM, or a flash memory, or a storage device, such as an HDD.

The first voice buffer 320a holds the first voice signals. The second voice buffer 320b holds the second voice signals. The third voice buffer 320c holds the third voice signals.

The transmitting unit 330 is a processing unit that transmits the first voice signals in the first voice buffer 320a, the second voice signals in the second voice buffer 320b, and the third voice signals in the third voice buffer 320c to the voice processing apparatus 400. The transmitting unit 330 may collectively or individually transmit the first to the third voice signals to the voice processing apparatus 400.

The display device 350 is connected to the voice processing apparatus 400 through the network 35. The display device 350 corresponds to a liquid-crystal display or the like. The display device 350 receives evaluation results of impressions of speech of the talkers 1A to 1C from the voice processing apparatus 400 and displays the evaluation results.

The voice processing apparatus 400, which receives the first, second, and third voice signals from the collecting equipment 300, separates, for each of the first, second, and third voice signals, voice other than the taker's voice corresponding to the respective voice signals. That is, by using the second and third voice signals as references, the voice processing apparatus 400 separates speech voice of the talkers 1B and 1C among speech voice of the talkers 1A to 1C, the speech voice being included in the first voice signals, to thereby extract the speech voice of the talker 1A. Also, by using the first and third voice signals as references, the voice processing apparatus 400 separates speech voice of the talkers 1A and 1C among speech voice of the talkers 1A to 1C, the speech voice being included in the second voice signals, to thereby extract the speech voice of the talker 1B. In addition, by using the first and second voice signals as references, the voice processing apparatus 400 separates speech voice of the talkers 1A and 1B among speech voice of the talkers 1A to 1C, the speech voice being included in the third voice signals, to thereby extract the speech voice of the talker 1C.

The voice processing apparatus 400 executes the voice processing illustrated in FIG. 7 on each of input streams of the first, second, and third voice signals resulting from the separation. During the voice processing, by starting up, for the respective input streams, functional units that are similar to those in the voice processing apparatus 100 illustrated in FIG. 6, the voice processing apparatus 400 may execute the voice processing illustrated in FIG. 7 in parallel. As described above, the present technology may be implemented as a meeting system in which functions that are the same as or similar to those in the first embodiment described above are provided. Although a case in which a meeting of the talkers 1A to 1C is held at one place has been described above by way of example, the voice processing illustrated in FIG. 7 is also applicable to a meeting system in which some or all participants participate from a remote location.

(3.3) Call Between End-Users

Figure 15:
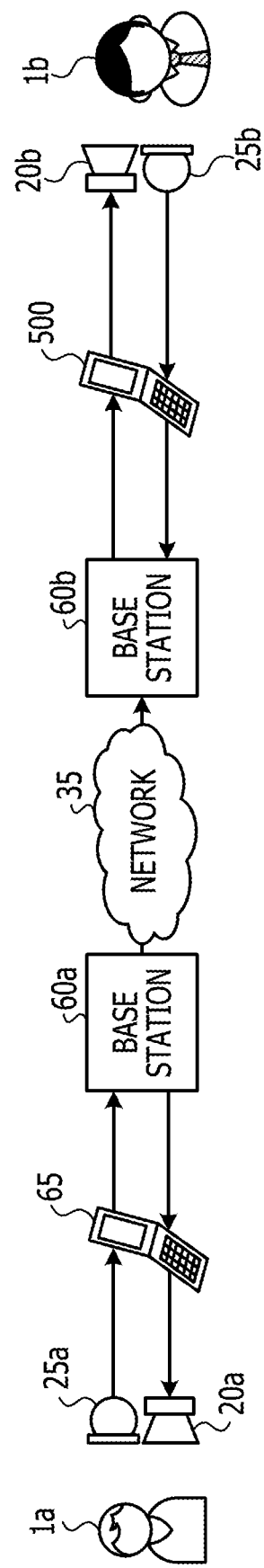
FIG. 15 illustrates an example of still another implementation.

FIG. 15 illustrates an example of still another implementation. As illustrated in FIG. 15, in this implementation, a system includes a portable terminal 65, base stations 60a and 60b, and a voice processing apparatus 500. The portable terminal 65 is connected to a speaker 20a and a microphone 25a. The voice processing apparatus 500 is connected to a speaker 20b and a microphone 25b.

The base stations 60a and 60b are connected to each other through a network 35. The base stations 60a and 60b are apparatuses that relay voice signals transmitted from the portable terminal 65 or the voice processing apparatus 500. For example, the base station 60b transmits voice signals, transmitted from the portable terminal 65, to the voice processing apparatus 500.

The portable terminal 65 corresponds to a mobile phone, a smartphone, a tablet terminal, a notebook personal computer (PC), or the like. The portable terminal 65 acquires voice signals of the talker 1a via the microphone 25a. The portable terminal 65 wirelessly connects to the base station 60a to transmit the acquired voice signals of the talker 1a to the voice processing apparatus 500. The voice signals transmitted to the voice processing apparatus 500 are output from the speaker 20b.

The voice processing apparatus 500 corresponds to a mobile phone, a smartphone, a tablet terminal, a notebook PC, or the like. In addition to having a phone-call function, the voice processing apparatus 500 evaluates speech of the talker 1a and displays the evaluation result.

A portable terminal used by an end-user executes the voice processing program to thereby virtually realize the functional units illustrated in FIG. 6, and thus the voice processing illustrated in FIG. 7 is not limited to use at a call center, a meeting system, or the like and is applicable to general calls.

[Voice Processing Program]

In addition, a computer, such as a personal computer or a workstation, may execute a prepared program to realize the various types of processing described above in the embodiments. Accordingly, an example of a computer that executes a voice processing program having functions that are the same as or similar to those in the above-described embodiments will be described below with reference to FIG. 16.

Figure 16:
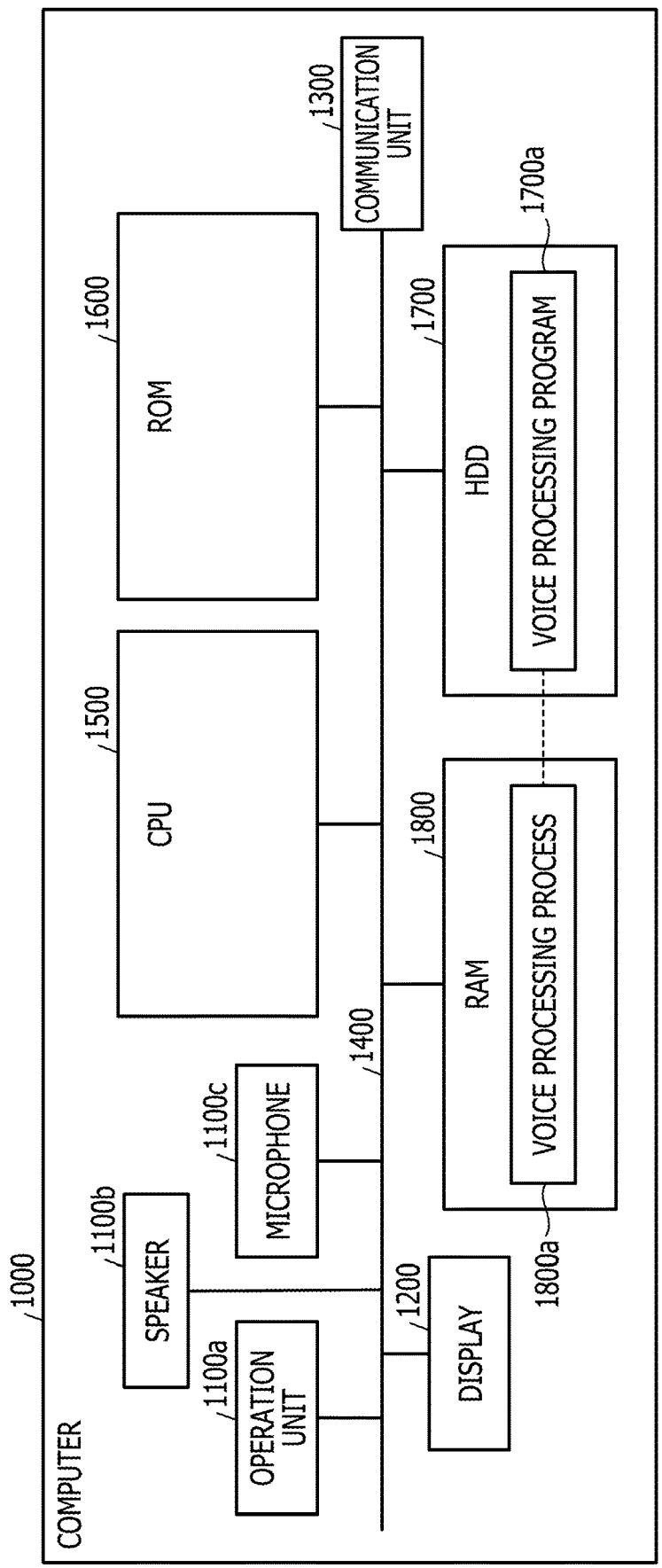
FIG. 16 illustrates an example hardware configuration of a computer that executes a voice processing program according to the first and second embodiments.

FIG. 16 illustrates an example hardware configuration of a computer that executes a voice processing program according to the first and second embodiments. As illustrated in FIG. 16, a computer 1000 includes an operation unit 1100a, a speaker 1100b, a microphone 1100c, a display 1200, and a communication unit 1300. The computer 1000 further includes a CPU 1500, a ROM 1600, an HDD 1700, and a RAM 1800. The operation unit 1100*a*, the speaker 1100*b*, the microphone 1100*c*, the display 1200, and the communication unit 1300, the CPU 1500, the ROM 1600, the HDD 1700, and the RAM 1800 are connected to each other through a bus 1400.

As illustrated in FIG. 16, a voice processing program 1700*a* is stored in the HDD 1700. The voice processing program 1700*a* provides functions that are the same as or similar to those of the acquiring unit 130A, the strength determining unit 130B, the speech-section detecting unit 130C, the acoustic-feature determining unit 130D, the deriving unit 130E, the updating unit 130G, the voice-likelihood determining unit 130H, the weight assigning unit 130I, and the distribution determining unit 130J described in the first embodiment. The voice processing program 1700*a* may also be integrated or separated, as in the constituent elements illustrated in FIG. 6. That is, all of the data described in the first embodiment may or may not be stored in the HDD 1700, and it is sufficient that data used for the processing are stored in the HDD 1700.

Under such an environment, the CPU 1500 reads the voice processing program 1700*a* from the HDD 1700 and loads the voice processing program 1700*a* to the RAM 1800. As a result, the voice processing program 1700*a* functions as a voice processing process 1800*a*, as illustrated in FIG. 16. The voice processing process 1800*a* loads various types of data, read from the HDD 1700, to an area included in a storage area in the RAM 1800 and allocated to the voice processing process 1800*a* and executes various types of processing using the loaded data. Examples of processing executed by the voice processing process 1800*a* include the processing illustrated in FIG. 7. In the CPU 1500, some or all of the processing units described in the first embodiment may operate, as long as the processing unit(s) corresponding to processing to be executed is (are) realized.

The above-described voice processing program 1700*a* may or may not be initially stored in the HDD 1700 or the ROM 1600. For example, the voice processing program 1700*a* may be stored in a portable physical medium, such as a flexible disk (the so-called floppy disk (FD)), a compact disc read-only memory (CD-ROM), a digital versatile disc (DVD), a magneto-optical disk, or an integrated circuit (IC) card, inserted into the computer 1000, and the computer 1000 may obtain the voice processing program 1700*a* from the portable physical medium and execute it. Also, the voice processing program 1700*a* may be stored in another computer, a server apparatus, or the like connected to the computer 1000 through a public line, the Internet, a local area network (LAN), a wide area network (WAN), or the like, and the computer 1000 may obtain the voice processing program 1700*a* therefrom and execute it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing method for estimating an impression of speech, the method comprising:
   executing an acquisition process that includes acquiring voice signals;
   executing a feature acquisition process that includes acquiring acoustic features regarding the voice signals from the voice signals;
   executing a voice-parameter acquisition process that includes acquiring a voice parameter regarding a frame of the voice signals;
   executing a relative-value determination process that includes determining a relative value between the voice parameter and a statistical value of the voice parameter;
   executing a weight assignment process that includes assigning a weight to the frame of the voice signals in accordance with the relative value, the assigning of the weight being configured to assign a maximum weight to the frame associated with the relative value having a predetermined value representing a high possibility that there is a voice component uttered by a person; and
   executing a distribution determination process that includes determining a distribution of the acoustic features, based on the weight assigned to the frame of the voice signals.

2. The voice processing method according to claim 1, the method further comprising:
   executing an evaluation process that includes outputting, based on the distribution of the acoustic features, an evaluation result of an impression of speech detected from the voice signals.

3. The voice processing method according to claim 2, wherein
   the voice-parameter acquisition process is configured to determine, for respective formants, formant frequencies regarding the frame of the voice signals as the voice parameter; and
   the relative-value determination process is configured to
      determine, for the respective formants, average values of formant frequencies in a plurality of frames included in the voice signals,
      determine, for the respective formants, ratios of the determined average values of the formant frequencies versus the corresponding determined formant frequencies regarding the frame of the voice signals, and
      determine, as the relative value, a combined ratio obtained by combining the determined ratios for the respective formants.

4. The voice processing method according to claim 1, wherein
   the weight assignment process is configured to assign a smaller weight to the frame of the voice signals as the relative value gets farther from the statistical value.

5. The voice processing method according to claim 1, wherein
   the voice-parameter acquisition process is configured to determine, as the voice parameter, frame power, spectral power, a signal noise ratio, or an autocorrelation coefficient regarding the frame of the voice signals; and
   the relative-value determination process is configured to determine, as the relative value, a difference between a maximum value of voice parameters determined from a plurality of frames included in the voice signals and the voice parameter regarding the frame of the voice signals.

6. The voice processing method according to claim 1, wherein
the voice-parameter acquisition process is configured to determine, as the voice parameter, a pitch frequency regarding the frame of the voice signals; and
the relative-value determination process is configured to determine, as the relative value, a ratio of a mode of voice parameters determined in a plurality of frames included in the voice signals and the voice parameter regarding the frame of the voice signals voice parameter.

7. A voice processing apparatus for estimating an impression of speech, the apparatus comprising:
a memory; and
a processor coupled to the memory and configured to
execute an acquisition process that includes acquiring voice signals,
execute a feature acquisition process that includes acquiring acoustic features regarding the voice signals from the voice signals,
execute a voice-parameter acquisition process that includes acquiring a voice parameter regarding a frame of the voice signals,
execute a relative-value determination process that includes determining a relative value between the voice parameter and a statistical value of the voice parameter,
execute a weight assignment process that includes assigning a weight to the frame of the voice signals in accordance with the relative value, the assigning of the weight being configured to assign a maximum weight to the frame associated with the relative value having a predetermined value representing a high possibility that there is a voice component uttered by a person, and
execute a distribution determination process that includes determining a distribution of the acoustic features, based on the weight assigned to the frame of the voice signals.

8. The voice processing apparatus according to claim 7, wherein the processor is further configured to:
execute an evaluation process that includes outputting, based on the distribution of the acoustic features, an evaluation result of an impression of speech detected from the voice signals.

9. The voice processing apparatus according to claim 8, wherein
the voice-parameter acquisition process is configured to determine, for respective formants, formant frequencies regarding the frame of the voice signals as the voice parameter; and
the relative-value determination process is configured to
determine, for the respective formants, average values of formant frequencies in a plurality of frames included in the voice signals,
determine, for the respective formants, ratios of the determined average values of the formant frequencies versus the corresponding determined formant frequencies regarding the frame of the voice signals, and
determine, as the relative value, a combined ratio obtained by combining the determined ratios for the respective formants.

10. The voice processing apparatus according to claim 7, wherein
the weight assignment process is configured to assign a smaller weight to the frame of the voice signals as the relative value gets farther from the statistical value.

11. The voice processing apparatus according to claim 7, wherein
the voice-parameter acquisition process is configured to determine, as the voice parameter, frame power, spectral power, a signal noise ratio, or an autocorrelation coefficient regarding the frame of the voice signals; and
the relative-value determination process is configured to determine, as the relative value, a difference between a maximum value of voice parameters determined from a plurality of frames included in the voice signals and the voice parameter regarding the frame of the voice signals.

12. The voice processing apparatus according to claim 7, wherein
the voice-parameter acquisition process is configured to determine, as the voice parameter, a pitch frequency regarding the frame of the voice signals; and
the relative-value determination process is configured to determine, as the relative value, a ratio of a mode of voice parameters determined in a plurality of frames included in the voice signals and the voice parameter regarding the frame of the voice signals voice parameter.

13. A non-transitory computer-readable storage medium for storing a voice processing computer program, the voice processing computer program causing a processor to perform processing for estimating an impression of speech, the processing comprising:
executing an acquisition process that includes acquiring voice signals;
executing a feature acquisition process that includes acquiring acoustic features regarding the voice signals from the voice signals;
executing a voice-parameter acquisition process that includes acquiring a voice parameter regarding a frame of the voice signals;
executing a relative-value determination process that includes determining a relative value between the voice parameter and a statistical value of the voice parameter;
executing a weight assignment process that includes assigning a weight to the frame of the voice signals in accordance with the relative value, the assigning of the weight being configured to assign a maximum weight to the frame associated with the relative value having a predetermined value representing a high possibility that there is a voice component uttered by a person; and
executing a distribution determination process that includes determining a distribution of the acoustic features, based on the weight assigned to the frame of the voice signals.

14. The non-transitory computer-readable storage medium according to claim 13, the processing further comprising:
executing an evaluation process that includes outputting, based on the distribution of the acoustic features, an evaluation result of an impression of speech detected from the voice signals.

15. The non-transitory computer-readable storage medium according to claim 14, wherein
the voice-parameter acquisition process is configured to determine, for respective formants, formant frequencies regarding the frame of the voice signals as the voice parameter; and the relative-value determination process is configured to
determine, for the respective formants, average values of formant frequencies in a plurality of frames included in the voice signals,
determine, for the respective formants, ratios of the determined average values of the formant frequencies versus the corresponding determined formant frequencies regarding the frame of the voice signals, and
determine, as the relative value, a combined ratio obtained by combining the determined ratios for the respective formants.

16. The non-transitory computer-readable storage medium according to claim 13, wherein
the weight assignment process is configured to assign a smaller weight to the frame of the voice signals as the relative value gets farther from the statistical value.

17. The non-transitory computer-readable storage medium according to claim 13, wherein
the voice-parameter acquisition process is configured to determine, as the voice parameter, frame power, spectral power, a signal noise ratio, or an autocorrelation coefficient regarding the frame of the voice signals; and
the relative-value determination process is configured to determine, as the relative value, a difference between a maximum value of voice parameters determined from a plurality of frames included in the voice signals and the voice parameter regarding the frame of the voice signals.

18. The non-transitory computer-readable storage medium according to claim 13, wherein
the voice-parameter acquisition process is configured to determine, as the voice parameter, a pitch frequency regarding the frame of the voice signals; and
the relative-value determination process is configured to determine, as the relative value, a ratio of a mode of voice parameters determined in a plurality of frames included in the voice signals and the voice parameter regarding the frame of the voice signals voice parameter.

* * * * *